United States Patent
Walker et al.

(10) Patent No.: US 6,513,014 B1
(45) Date of Patent: *Jan. 28, 2003

(54) METHOD AND APPARATUS FOR ADMINISTERING A SURVEY VIA A TELEVISION TRANSMISSION NETWORK

(75) Inventors: Jay S. Walker, Ridgefield, CT (US); James A. Jorasch, Stamford, CT (US); Magdalena Mik, Greenwich, CT (US); Kathleen M. Van Luchene, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/282,128

(22) Filed: Mar. 31, 1999

Related U.S. Application Data

(63) Continuation-in-part of application No. 09/110,626, filed on Jul. 6, 1998, now Pat. No. 6,093,026, which is a continuation-in-part of application No. 08/685,706, filed on Jul. 24, 1996, now Pat. No. 5,862,223.

(51) Int. Cl.[7] .............................................. G06F 17/60
(52) U.S. Cl. ................................. 705/10; 705/7; 705/1
(58) Field of Search .......................... 348/1, 3; 705/10, 705/7, 1

(56) References Cited

U.S. PATENT DOCUMENTS

| | | | | |
|---|---|---|---|---|
| 4,355,372 A | * | 10/1982 | Johnson et al. | 379/92.04 |
| 4,576,579 A | | 3/1986 | Harte | 434/334 |
| 4,789,928 A | | 12/1988 | Fujisaki | 364/401 |
| 4,789,929 A | | 12/1988 | Nishimura et al. | 364/413.15 |
| 4,816,904 A | | 3/1989 | McKenna et al. | |
| 4,876,592 A | | 10/1989 | Von Kohorn | 358/84 |
| 4,903,201 A | | 2/1990 | Wagner | 364/408 |
| 5,021,953 A | | 6/1991 | Webber et al. | 364/407 |

(List continued on next page.)

FOREIGN PATENT DOCUMENTS

| | | |
|---|---|---|
| EP | 0 128 481 A2 | 12/1984 |
| JP | 09097250 | 4/1997 |

OTHER PUBLICATIONS

Urken, Arnold B.; "Polls, Surveys, and Choice Processor Technology on the World Wide Web," WWW Journal, Issue 3.

(List continued on next page.)

*Primary Examiner*—Tariq R. Hafiz
*Assistant Examiner*—Akiba Robinson-Boyce
(74) *Attorney, Agent, or Firm*—Magdalena M. Fincham

(57) ABSTRACT

In accordance with the present invention, a controller such as a cable television company receives a survey including survey questions from a client desiring to have a survey conducted. The controller creates respondent questions based on the survey questions. The controller also selects one or more respondents from a group of respondents requesting to participate in a survey. The respondent questions are transmitted to the selected respondents via a television transmission network, e.g., a cable television transmission network. Responses corresponding to the respondent questions are received. The controller applies an inconsistency test to the responses to generate an inconsistency test result. The inconsistency test determines if the responses originate from computers or humans not paying attention to the questions. Based on the inconsistency test result, a fraud signal may be generated. The fraud signal may result in several actions, such as the controller ignoring the responses received from the corresponding respondent, reducing or eliminating payment to the respondent, transmitting a message of reprimand to the respondent, and/or barring the respondent from future participation in surveys.

78 Claims, 23 Drawing Sheets

U.S. PATENT DOCUMENTS

| | | | |
|---|---|---|---|
| 5,191,613 A | | 3/1993 | Graziano et al. ............. 380/25 |
| 5,227,874 A | * | 7/1993 | Von Kohorn ................ 705/10 |
| 5,259,766 A | | 11/1993 | Sack et al. .................. 434/362 |
| 5,553,145 A | | 9/1996 | Micali ......................... 380/30 |
| 5,557,518 A | | 9/1996 | Rosen ........................ 364/408 |
| 5,557,773 A | | 9/1996 | Wang et al. ................ 395/500 |
| 5,628,011 A | | 5/1997 | Ahamed et al. ............ 395/610 |
| 5,630,125 A | | 5/1997 | Zellweger ................... 395/614 |
| 5,725,384 A | | 3/1998 | Ito et al. ...................... 434/350 |
| 5,740,035 A | * | 4/1998 | Cohen et al. ................ 705/10 |
| 5,862,223 A | * | 1/1999 | Walker et al. ............... 380/25 |
| 5,872,589 A | * | 2/1999 | Morales ...................... 348/13 |
| 5,961,332 A | | 10/1999 | Joao ........................... 434/236 |
| 5,970,467 A | * | 10/1999 | Alavi .......................... 705/10 |
| 6,093,026 A | * | 7/2000 | Walker et al. .............. 434/322 |
| 6,139,430 A | | 10/2000 | Huard et al. ................. 463/16 |
| 6,253,186 B1 | * | 6/2001 | Pendleton, Jr. .............. 705/2 |
| 6,256,614 B1 | | 7/2001 | Wecker et al. ............... 705/14 |
| 2001/0003099 A1 | | 6/2001 | Von Kohorn ............... 463/40 |
| 2001/0052009 A1 | | 12/2001 | Desai et al. ................ 709/224 |
| 2001/0052122 A1 | | 12/2001 | Nanos et al. ................. 725/9 |
| 2002/0002482 A1 | | 1/2002 | Thomas ....................... 705/10 |

OTHER PUBLICATIONS

Welch, Nathalie; "Data Marketplace to Get Mac Client; American Information Exchange; Brief Article; Product Announcement," MacWeek, vol. 6, No. 9, p. 16; Mar. 2, 1992.

"Information Industries; New Ideas on the Block," The Economist, Section of Business, finance and science, p. 83; Mar. 14, 1992.

Orr, Joel N., Dr.; "Join the Information Economy; American Information Exchange Online Information Service is the Brainchild of Phil Salin; the Computer–Aided Engineer," Computer–Aided Engineering, vol. 11, No. 4, p. 84; Apr. 1992.

Padgett, Lauree; "Information Marketplace Stocks 'Shelves' for Mid–June Debut: The New Service will be a Meeting Place for Buyers and Sellers; Introduction of American Information Exchange Corp.," Link–UP, vol. 9, No. 3, p. 1; May 1992.

"The American Information Exchange Corp. Announces Relocation from Palo Alto to Mountain View," Business Wire; Jul. 31, 1992.

Eisenberg, Amee; "Shopping for Software: It May Never be the Same; Smart Shopper; Column," Computer Shopper, vol. 12, No. 8, p. 850; Aug. 1992.

Blanco, Rock; "Electronic Markets Bring it all Home; Use of Electronic Real Estate Data Bases; Industry Outlook; Service Sector," Corporate Computing, vol. 1, No. 2, p. 201; Aug. 1992.

Weisman, Jonathan; "Amix Cuts Staff in the Wake of Leaving Parent Company," The Business Journal–San Jose, vol. 10, No. 21, Sec. 1, p. 4; Sep. 7, 1992.

Wright, Benjamin; "High–Tech Juice Keeps Electronic Emporiums Humming," Computerworld, p. 109; Oct. 12, 1992.

"Moving Too Fast with IPASS," The Indianapolis News, p. A10; Mar. 1, 1995.

Caruso, Denise; "Technology: Digital Commerce; An Operating System to Keep the Wide Spaces Open While Providing Security," The New York Times, Section D, p. 5, col. 5; Oct. 23, 1995.

Matthews, Noah; "Programs to H elp Teachers with Grading, Tests," The Record, Lifestyle Section, p. E03; Jan. 2, 1996.

Naylor, Janet; "State Looks for Graders to Tally up Kids' Score," The Detroit News, Metro Section; Jan. 24, 1996.

Smith, Gina; "Inside Silicon Valley: Paving the way for Online Business," (www.communities.convsvalley.html), Download Date: Oct. 21, 1996.

"Electric Communities: Company Profile," Electric Communities, (www.communities.com), Download Date: Jul. 10, 1996.

Farmer, Randall F.; "From Habitat to Global Cyberspace," Electric Communities, (www.communities.com/paper/hab2cybr.html), Download Date: Oct. 21, 1996.

"Overset: Interactive—So You Think You Know a Thing or Two about Web Development?" Media Daily, No. 5, vol. 4; Feb. 20, 1997.

"New Website Pays Cash to Surf," PR Newswire, Financial News Section; Feb. 3, 1998.

"Feedbackexpress," FeedbackExpress, (www.feedbackexpress.com), Download Date: Apr. 30, 1998.

"Survey.Net—Business & Politics," InterCommerce Corporation, (www.survey.net/m/html), Download Date: May 26, 1998.

"Phase 5 Consulting—Techniques and Resources," Phase 5, (www.phase–5.com/techniques.html), Download Date: May 27, 1998.

"Use Internet Technology to Enhance Customer Satisfaction Measurement," Customer Service Group, (www.alexcommgrp.com/csg/html/cstarticle.html), Download Date: May 27, 1998.

"Bussoft Online Market Research," Business Internet, Inc., (www.bus.net/survey.html), Download Date: May 27, 1998.

"Opinionator: Online Research Methodologies," CLT Research Associates, Inc., (www.cltresearch.com/OP8R.html), Download Date: May 27, 1998.

"Quanvert for Interactive Analysis," Quantime Corporation, (www.quantime.co.uk/corporate/products/quanvert,html), Download Date: May 28, 1998.

"New Software Brings Power and Capability to Web Research," Quantime Corporation, (www.quantime.co.uk/corporate/press/Qcweb/html), Download Date: May 28, 1998.

"Testnow—Learn More," (www.testnow.com/info/learn.html), Download Date: Jun. 12, 1998.

"Greenfield Online," Greenfield Online, (wwwgreenfieldonline.com), Download Date: Jun. 19, 1998.

"How the HTMail System Works," HTMail Ltd., (www.htmail.com/how.html), Download Date: Jun. 19, 1998.

"Simulation Research: How does Visionary Shopper Work?" (www.simulationresearch.com/vs.html), Download Date: Sep. 8, 1998.

Davis, L.J.; "The Billionaire Shell Game: How Cable Baron John Malone and Assorted Corporate Titans Invented a Future Nobody Wanted," Bantam Doubleday Dell Publishing Group, Inc., Oct. 1998, p. 214.

Gold, Steve; "Gemstar to use Paging Frequencies for 2–Way TV Technology," Newsbytes, Dec. 1, 1998.

"IBM: An Introduction to Interactive Television," International Business Machines, (www.hursley.ibm.com/misc/xw–itvintro.html), Download Date: Jan. 29, 1999.

"Market Facts and Juno to Establish World's Largest Interactive Market Research Panel," Juno, (www.juno.com/pr/marketfacts.html), Download Date: Mar. 23, 1999.

"@PCDATA," (www.okpayme.com), Download Date: Mar. 31, 1999.
Int. Search Report Oct. 20, 1999 PCT.
Eisenhart, Mary, Interview with John Walker, Microtimes, Mar. 26, 1992, (http //www fourmilabch/autofile/www/chapter2$_{13}$101 html#7699).
Website: "Market Facts and Juno to Establish World's Largest Interactive Market Research Panel", Juno News, (http//www juno com/pr/marketfacts htm), download date: May 27, 1998.

Website: "How Does Visionary Shopper Work?", Simulation Research, (http www simulation research com/vs htm), download date: Sep. 8, 1998.

* cited by examiner

| CLIENT IDENTIFIER 408 | CLIENT NAME 410 | CLIENT ADDRESS 412 | BILLING INFORMATION 414 | PREFERRED RESULTS DELIVERY METHOD 416 |
|---|---|---|---|---|
| C 100 | CORPORATION X | 1 MAIN ST. CITY, STATE | SEND BILL TO POSTAL ADDRESS | TO POSTAL ADDRESS |
| C 101 | POLITICAL PARTY A | 10 ELM DR. ANYWHERE, NY | CHARGE CREDIT CARD ACCOUNT 1111-1111-1111-1111 | FAX TO (111)555-5553 |
| C 102 | MUNICIPALITY Q | 1 PROSPECT ST. SMALLVILLE, USA | E-CASH DELIVERED WITH SURVEY | ABC@ MUNICIPALITY.COM |

400

402 → C 100 row
404 → C 101 row
406 → C 102 row

FIG. 4

| CERTIFICATION QUESTION IDENTIFIER 906 | CERTIFICATION QUESTION DESCRIPTION 908 | ANSWER SEQUENCE 910 | PROPER ANSWER 912 |
|---|---|---|---|
| 1 | "WHICH WAY DO THINGS FALL?" | 1 = UP<br>2 = DOWN | DOWN |
| 2 | "WHAT COLOR IS THE SKY?" | 1 = BLUE, 2 = RED, 3 = ORANGE | BLUE |

| CERTIFICATION QUESTION IDENTIFIER | CERTIFICATION QUESTION DESCRIPTION | ANSWER SEQUENCE | PROPER ANSWER |
|---|---|---|---|
| 1 | "WHICH WAY DO THINGS FALL?" | 1 = UP, 2 = DOWN | DOWN |
| 2 | "WHAT COLOR IS THE SKY?" | 1 = RED, 2 = BLUE 3 = ORANGE | BLUE |

902 → (first row), 904 → (second row)

← 501

| SQ 1111 |||
|---|---|---|
| QUESTION IDENTIFIER | QUESTION DESCRIPTION | ANSWER SEQUENCE |
| 1 | "I BELIEVE THERE IS TOO MUCH VIOLENCE ON TELEVISION." | 1 = STRONGLY AGREE, 2 = AGREE SOMEWHAT, 3 = DISAGREE SOMEWHAT, 4 = STRONGLY DISAGREE |
| 2 | "I PREFER FAMILY PROGRAMMING." | 1 = YES, 2 = NO |

530 → (first row), 532 → (second row)

← 1000

| RESPONDENT QUESTION IDENTIFIER 1014 | RESPONDENT QUESTION DESCRIPTION 1018 | ANSWER SEQUENCE 1020 |
|---|---|---|
| 1 | "I PREFER FAMILY PROGRAMMING." | 1 = YES, 2 = NO |
| 2 | "WHICH WAY DO THINGS FALL?" | 1 = UP, 2 = DOWN |
| 3 | "I BELIEVE THERE IS TOO MUCH VIOLENCE ON TELEVISION." | 1 = STRONGLY AGREE, 2 = AGREE SOMEWHAT, 3 = DISAGREE SOMEWHAT, 4 = STRONGLY DISAGREE |
| 4 | "I PREFER FAMILY PROGRAMMING." | 1 = NO, 2 = YES |
| 5 | "WHICH WAY DO THINGS FALL?" | 1 = UP, 2 = DOWN |
| 6 | "I PREFER FAMILY PROGRAMMING." | 1 = YES, 2 = NO |

Figure 17:
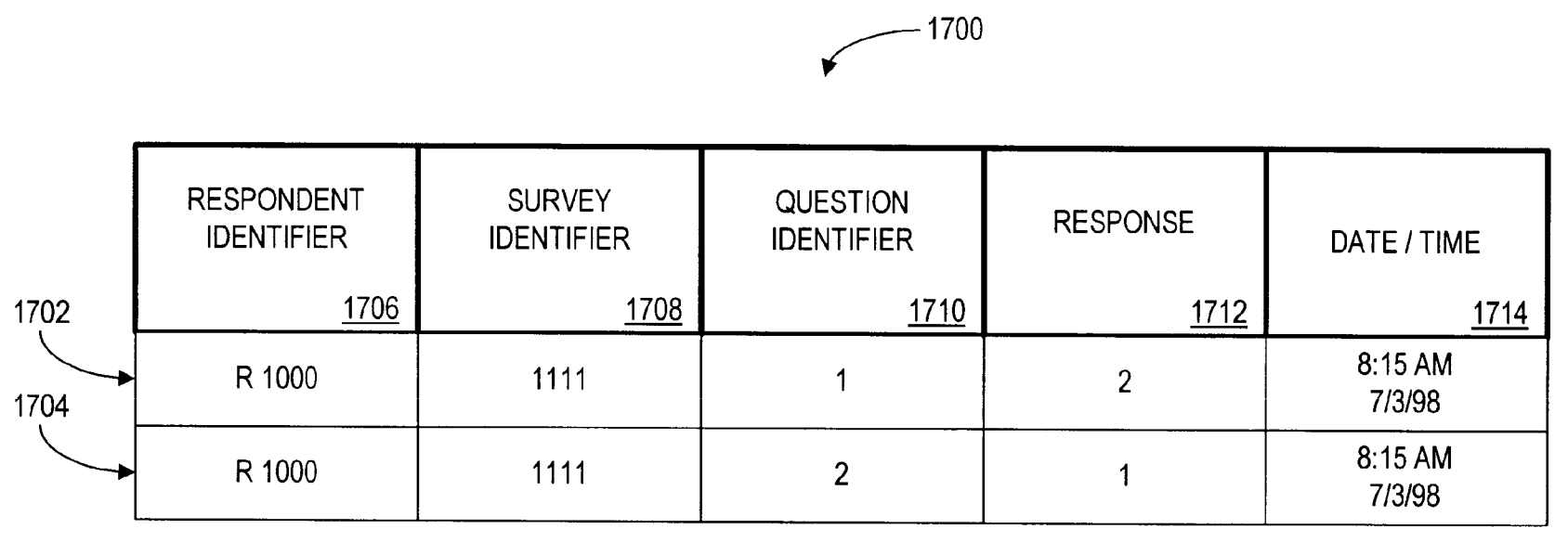

| RESPONDENT IDENTIFIER 1706 | SURVEY IDENTIFIER 1708 | QUESTION IDENTIFIER 1710 | RESPONSE 1712 | DATE / TIME 1714 |
|---|---|---|---|---|
| R 1000 | 1111 | 1 | 2 | 8:15 AM 7/3/98 |
| R 1000 | 1111 | 2 | 1 | 8:15 AM 7/3/98 |

┌─────────────────────────────────┐
        │   SURVEY IDENTIFIER 1111        │
        │                          1802   │
        ├─────────────────┬───────────────┤
        │   NUMBER OF     │  CONFIDENCE   │
        │   RESPONSES =   │   LEVEL =     │
        │     10,101      │    98%, 1     │
        │         1804    │        1806   │
        ├─────────────────┼───────────────┤
        │   QUESTION      │               │
        │   IDENTIFIER    │   RESPONSES   │
        │                 │               │
        ├─────────────────┼───────────────┤
        │                 │ 1- 53%, 2- 7%,│
        │       1         │ 3- 14%, 4- 26%│
        ├─────────────────┼───────────────┤
        │       2         │ 1- 75%, 2- 25%│
        └─────────────────┴───────────────┘
```

1808 → (row 1)
1810 → (row 2)

FIG. 18

| QUESTION IDENTIFIER 1908 | QUESTION 1910 | SQ 11111 ANSWER SEQUENCE 1912 | PRIORITY 1914 |
|---|---|---|---|
| 1 | "I BELIEVE THERE IS TOO MUCH VIOLENCE ON TELEVISION." | 1 = STRONGLY AGREE, 2 = AGREE SOMEWHAT, 3 = DISAGREE SOMEWHAT, 4 = STRONGLY DISAGREE | HIGH |
| 2 | "I PREFER FAMILY PROGRAMMING." | 1 = YES, 2 = NO | LOW |

METHOD AND APPARATUS FOR ADMINISTERING A SURVEY VIA A TELEVISION TRANSMISSION NETWORK

CROSS REFERENCE TO RELATED PATENT APPLICATIONS

The present application is a continuation in-part application of patent application Ser. No. 09/110,626, entitled "METHOD AND APPARATUS FOR ADMINISTERING A SURVEY", filed on Jul. 6, 1998, and issued on Jul. 25, 2000 as U.S. Pat. No. 6,093,026, which is a continuation-in-part application of patent application Ser. No. 08/685,706, entitled "METHOD AND APPARATUS FOR A CRYPTOGRAPHICALLY-ASSISTED COMMERCIAL NETWORK SYSTEM DESIGNED TO FACILITATE AND SUPPORT EXPERT-BASED COMMERCE, filed on Jul. 24, 1996, issued as U.S. Pat. No. 5,862,223 on Jan. 19, 1999, the entirety of which are incorporated by reference herein as part of the present disclosure.

FIELD OF THE INVENTION

The present invention relates to methods and apparatus for administering surveys and more particularly to methods and apparatus for administering surveys via a television transmission network.

BACKGROUND OF THE INVENTION

Surveys are an effective tool for gathering data on a variety of facts and opinions. Surveys can aid businesses and organizations in defining and/or achieving their goals and policies. Manufacturers, in particular, find surveys useful in ascertaining the appeal of their products and product packaging to the average customer. For example, Proctor and Gamble, when designing a color scheme for a box of laundry detergent, finds consumer opinions very useful in choosing one that is most appealing. Even more beneficial to Proctor and Gamble is the knowledge of preference for the box color scheme in different countries and regions so that they can adapt the color of the box appropriately.

A typical survey constitutes a set of questions that are distributed to a group of people having appropriate characteristics or within a desired demographic group. The group returns responses to the questions, and the responses are assembled to determine, for example, average responses and majority responses. The conventional ways for administering surveys include, for example, (i) calling people in the demographic group of interest and asking them to answer questions, (ii) soliciting the information from consumers shopping in supermarkets or malls, (iii) posting the surveys on the Internet for interested parties to participate in, and (iv) mailing out surveys to potential or present consumers of various products and services. These methods of administering surveys contain inherent drawbacks, for example, consumers often feel harassed and inconvenienced by survey solicitors and neglect to answer survey questions thoughtfully. These methods also require time-consuming processes of compiling raw data into informative vehicles of information.

Television is potentially a very effective way of conducting surveys. Television, viewers constitute a large and diverse portion of the population, and thus they serve as a good representation of the pool of product consumers. Surveys conducted via cable television systems, however, have not had wide success. One method of administering surveys over cable television is disclosed in U.S. Pat. No. 4,876,592 to Von Kohorn in which consumers watching home-shopping stations and the like can agree to answer questions and in return receive payment, usually in the form of certificates or coupons. Such surveys, however, are particularly susceptible to a variety of attacks that compromise the integrity of the collected data. Since surveys conducted via cable television systems allow respondents to participate remotely, they are unsupervised and can submit random responses rather than meaningful responses. Even worse, an appropriately designed computer program can submit random or otherwise meaningless responses while appearing to be one or more respondents. There is always the possibility that a significant part of data collected from such a survey will be inaccurate or otherwise untrustworthy. Since the data collected by such surveys is not accurate or trustworthy, product manufacturers have not widely accepted cable television-administered surveys as a reliable method for product testing. Cable television providers, in turn, do not make these surveys available.

Technological limitations have also restrained businesses from conducting surveys via cable television. There have been many technological advances in the area of cable television transmission systems, but they have not yet been utilized in administering surveys via cable television. These potentially useful transmission methods include radio frequency transmission as used by Gemstar International to streamline interactive television systems, fiber optic cable, and coaxial cable. In addition, digital television is rapidly being recognized as the practical future of television because of its highly-compressible data that can be stored in small space and thus transmitted quickly. To applicant's knowledge none of these technologies has been effectively applied in conducting surveys via cable television.

Thus, a need exists for a system that administers surveys via cable television that fully utilizes possible cable transmission technologies and that also includes fraud protection features. Accordingly, it would be advantageous to provide a method and apparatus for conducting surveys that reduced or eliminated the above-described shortcomings.

SUMMARY OF THE INVENTION

It is an object of the present invention to provide a method and apparatus for conducting surveys via a television transmission network that reduces or eliminates the shortcomings of known systems.

In accordance with the present invention, a controller such as a cable television provider computer receives a survey including survey questions from a client desiring to have a survey conducted. The controller creates respondent questions based on the survey questions. The controller also selects one or more respondents to participate in the survey. The respondent questions are transmitted to the selected respondents via a television transmission network. Responses corresponding to the respondent questions are received.

The controller applies an inconsistency test to the responses to generate an inconsistency test result. The inconsistency test determines if the responses originate from computers or humans not paying attention to the questions. Based on the inconsistency test result, a fraud signal may be generated. The fraud signal may result in several actions, such as the controller ignoring the responses received from the corresponding respondent, reducing or eliminating payment to the respondent, transmitting a message of reprimand to the respondent, and/or barring the respondent from future participation in surveys.

BRIEF DESCRIPTION OF THE DRAWINGS

FIG. 4 is a schematic illustration of a client database of the controller of FIG. 3.

FIG. 9 is a schematic illustration of a certification question database of the controller of FIG. 3.

FIG. 10 is a schematic illustration of the survey database and the certification question database of FIGS. 5 and 9, respectively.

FIG. 17 is a schematic illustration of a response database of the controller of FIG. 3.

FIG. 18 is a schematic illustration of a survey results database of the controller of FIG. 3.

FIG. 19 is a schematic illustration of another embodiment of the survey database of the controller of FIG. 3.

DETAILED DESCRIPTION OF THE PREFERRED EMBODIMENTS

Figure 1:
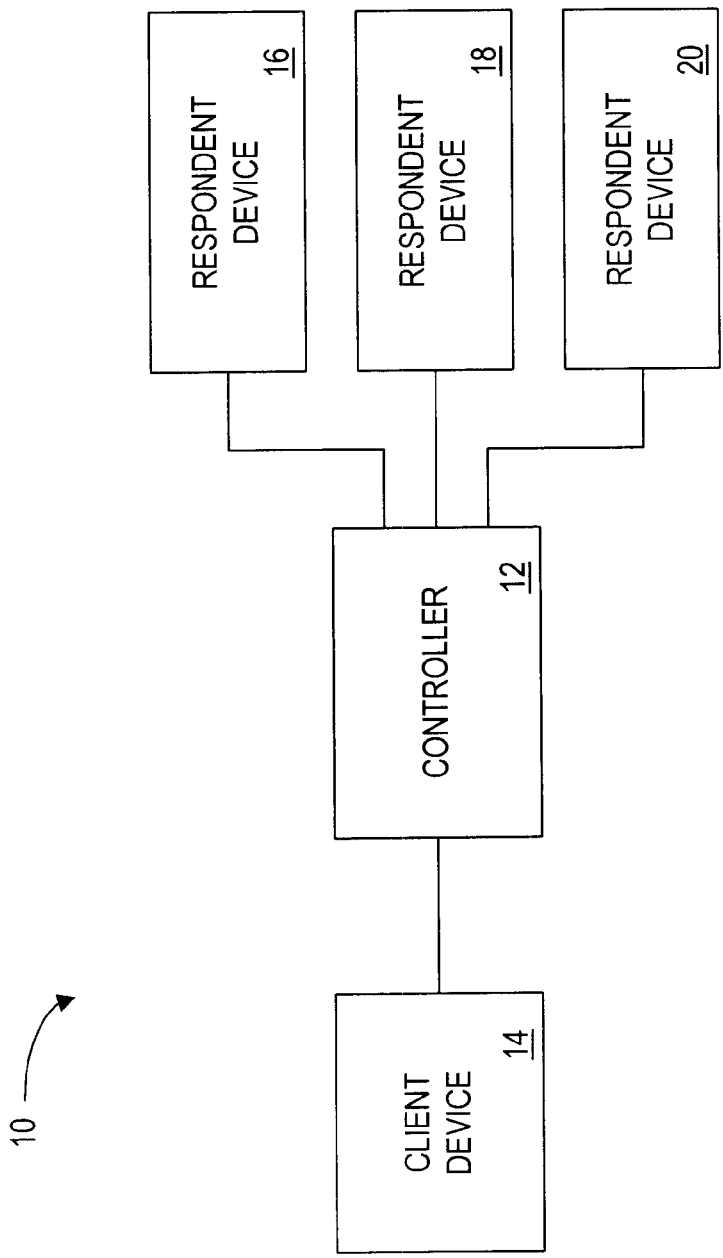
FIG. 1 is a schematic illustration of an apparatus for conducting a survey.

Referring to FIG. 1, an apparatus 10 for conducting a survey comprises a controller 12 that is in communication with a client device 14 and with respondent devices 16, 18 and 20. Each of the controller 12 and the client device 14 are typically computers or other devices for communicating over a computer network such as the Internet. Each of the respondent devices 16, 18 and 20 typically include a television, an input device, and a set-top controller for communicating to the controller 12 over a television transmission network such as a cable television transmission network. Cable television transmission networks are described in European Publication No. 0128481, the entirety of which is incorporated by reference herein as part of the present disclosure.

Although three respondent devices are shown in FIG. 1, any number of respondent devices may be in communication with the controller 12.

The controller 12 administers surveys to persons in demographic groups specified by the manufacturers or marketers providing the surveys. The controller 12 receives desired survey questions and survey parameters from a client operating the client device 14. The controller 12 in turn conducts the specified survey by transmitting the survey questions to respondent devices 16, 18 and 20. In one embodiment, the controller 12 may be a computer operated by or on behalf of a cable television company. Such a computer typically facilitates the connection of many televisions to the cable television company.

The client device 14 is typically a conventional personal computer, such as those based on the Intel® Pentium® microprocessor. Those skilled in the art will understand that there are many appropriate apparatus for allowing the client device 14 to communicate with the controller 12 over a network.

Figure 2:
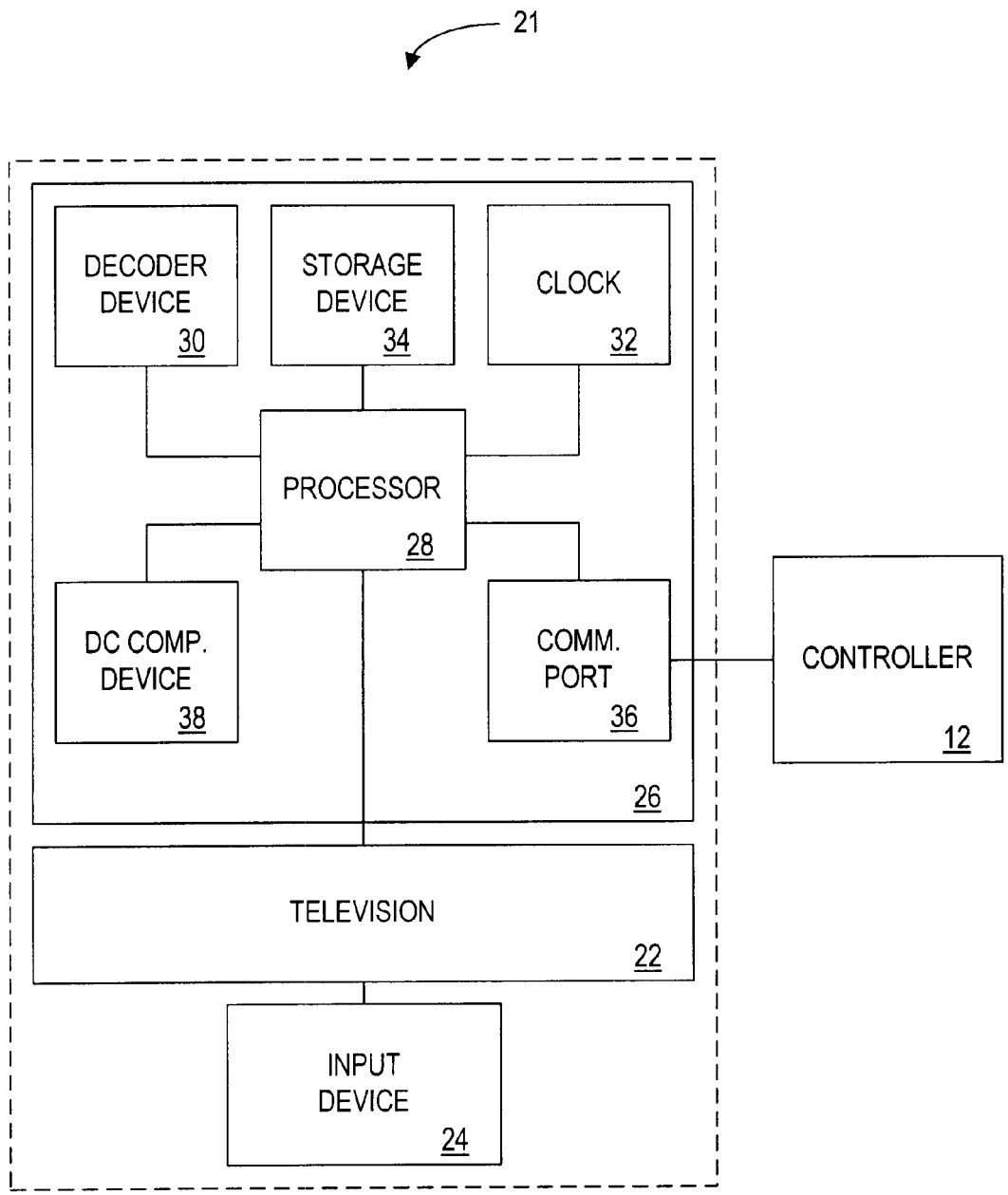
FIG. 2 is a schematic illustration of a respondent device of the apparatus of FIG. 1.

Referring to FIG. 2, a representative respondent device 21 comprises a set-top controller 26 that is in communication with a television 22, which is in communication with an input device 24. The set-top controller 26 includes a set-top processor 28 that is in communication with a decoder device 30, a clock 32, and a data storage device 34 such as an appropriate combination of magnetic, optical and/or semiconductor memory. The set-top controller 26 further includes a communication port 36 in communication with the set-top processor 28 and the controller 12 to facilitate transmission between the controller 12 and the set-top controller 26 via the cable television transmission network. The communication via the television connection may be provided by wireless modes (e.g. satellite), twisted pair cable, coaxial cable or any combination thereof. The set-top processor 28 of the set-top controller 26 may be one or more conventional microprocessors such as an Intel® Pentium® micrtoprocessor. The set-top controller 26 may also include a decompression device 38 in communication with the set-top processor 28 for decompressing transmitted digital signals transmitted via the television transmission network.

The set-top processor 28, clock 32, storage device 34, decoder device 30, communication port 36 and the decompression device 38 of the set-top controller 26 may each be located entirely within a single computing device, in communication with each other by a remote communication medium such as a serial port cable, telephone line or radio frequency transceiver, or a combination thereof. For example, the decoder device 38 may be disposed in the television 22 remote from the set-top processor 28.

The clock 32 generates signals indicative of the current time, thereby allowing the processor 28 to measure the time elapsed between events. The storage device 34 stores a program for controlling the set-top processor 28. The set-top processor 28 performs instructions of the program and thereby operates in accordance with the present invention. The program furthermore includes program elements that may be necessary, such as "device drivers" for allowing the processor 28 to interface with peripheral devices, such as the input device 24 (or other input devices) and the television. Appropriate device drivers and other necessary program elements are known to those skilled in the art and thus need not be described in detail herein.

The decoder device 30 receives encoded television transmission signals from the controller 12 and decodes the transmission signals for display on the television 22.

The television 22 displays televised signals provided by the set-top controller 26 to provide television programming to the customer. The television programming may include a channel dedicated to conducting surveys to enable a customer or viewer to select the survey channel and participate in a survey. In the alternative, the television programming may permit the customer to participate in a survey at any selected channel. For example, the customer may elect to participate in a survey by selecting a displayed icon or menu option available on any channel. Selection of the icon or menu option transmits a log on signal to the controller indicating that the customer desires to participate in a survey. Further, the television programming may prompt or request the customer to participate in a survey. For example, a respondent viewing a commercial or television program may be requested to participate in a survey that is related in some aspect to the product or service being advertised, or program being televised.

The input device 24 may comprise a keyboard in communication with the television 22 to allow the respondent to select a survey and/or respond to the survey questions displayed on the television. The keyboard enables the consumer to select an answer from a number of choices or type in an answer or comment to a survey question or request. The input device 24 may also be used to provide personal information of a respondent interested in participating in future surveys offered by the cable company. In the alternative, the input device may include a wireless device, e.g. a television remote control, for selecting responses to the survey. For example, the respondent may use the remote control to highlight a displayed response to a survey question and then enter the highlighted response. While the input device 24 is shown in communication with the television 22, one will appreciate that the input device may be in communication with the set-top processor 28 or in direct communication with the controller 12, as will be described in greater detail hereinafter.

If desired, known cryptographic techniques may be used to authenticate the identity of parties transmitting messages in the apparatus 10 for conducting a survey. The use of cryptographic techniques can also serve to verify the integrity of the message, determining whether the message has been altered during transmission. Encryption can also prevent eavesdroppers from learning the contents of the message. Such techniques are referred to generally as cryptographic assurance methods, and include the use of both symmetric and asymmetric keys as well as digital signatures and hash algorithms. The practice of using cryptographic protocols to ensure the authenticity of the identities of parties transmitting messages as well as the integrity of messages is well known in the art and need not be described here in detail. Accordingly, one of ordinary skill in the art may refer to Bruce Schneier, Applied Cryptography, Protocols, Algorithms, And Source Code In C, (2d Ed, John Wiley & Sons, Inc., 1996). The use of various encryption techniques are described in the above-referenced parent application, as are other methods for ensuring the authenticity of the identities of parties transmitting messages. In addition, the present invention provides for the anonymity of both clients and respondents, as is also described in detail in the above-referenced parent application.

Figure 3:
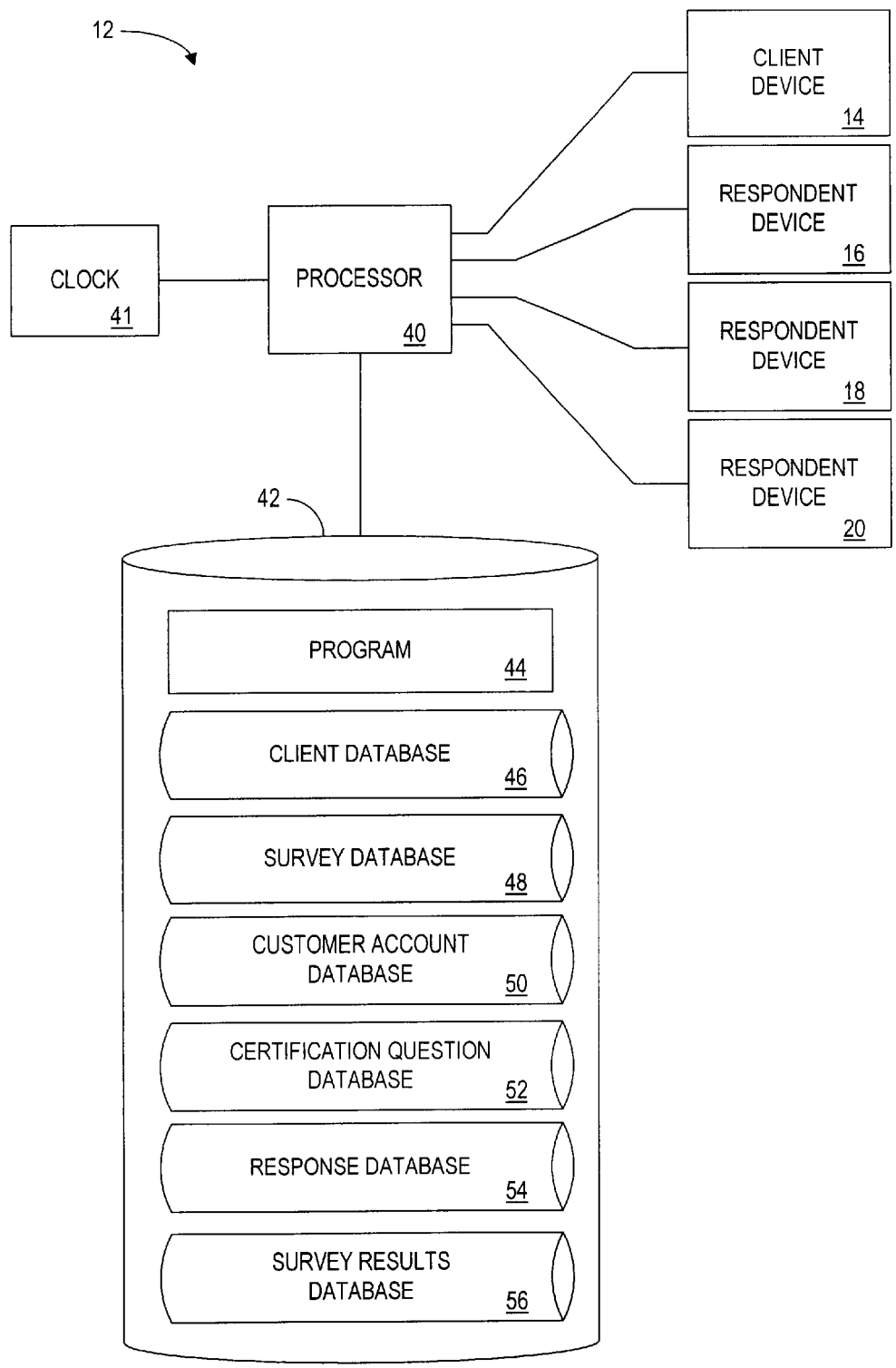
FIG. 3 is a schematic illustration of a controller of the apparatus of FIG. 1.

Referring to FIG. 3, the controller 12 of FIG. 1 comprises a processor 40, which may be one or more conventional microprocessors such as the Intel® D Pentium® microprocessor or the Sun Microsystems 166 MHz UltraSPARC-I microprocessor. The processor 40 is in communication with a clock 41 and a data storage device 42 such as an appropriate combination of magnetic, optical and/or semiconductor memory. The processor 40, clock 41 and the storage device 42 may each be (i) located entirely within a single computer or other computing device; (ii) in communication with each other by a remote communication medium such as a serial port cable, telephone line or radio frequency transceiver; or (iii) a combination thereof. For example, the controller 12 may comprise one or more computers that are in communication with a remote server computer for maintaining databases.

The clock 41 generates signals indicative of the current time, thereby allowing the processor 40 to measure the time elapsed between events. The storage device 42 stores a program 44 for controlling the processor 40. The processor 40 performs instructions of the program 44 and thereby operates in accordance with the present invention, and particularly in accordance with the methods described in detail herein. The program 44 furthermore includes program elements that may be necessary, such as an operating system and "device drivers" for allowing the processor 40 to interface with computer peripheral devices, such as a keyboard (or other input device) and video monitor or other output device. Appropriate device drivers and other necessary program elements are known to those skilled in the art and thus need not be described in detail herein.

The storage device 42 also stores (i) a client database 46, (ii) a survey database 48, (iii) a customer account database 50, (iv) a certification question database 52, (v) a response database 54, and (vi) a survey results database 56. The databases 46, 48, 50, 52, 54 and 56 are described in detail below and depicted with exemplary entries in the accompanying figures. As will be understood by those skilled in the art, the schematic illustrations of and accompanying descriptions of the databases presented herein are exemplary arrangements for stored representations of information. A number of other arrangements may be employed besides those represented by the tables shown. Similarly, the illustrated entries represent exemplary information, but those skilled in the art will understand that the number and content of the entries can be different from those illustrated herein.

Referring to FIG. 4, a table 400 represents an embodiment of the client database 46 of FIG. 2. The table 400 includes rows 402, 404 and 406, each of which represents an entry of the client database 46. Each entry defines a client, which is an entity that has the controller 12 (FIG. 1) conduct surveys on its behalf. In particular, each entry includes (i) a client identifier 408 that uniquely identifies the client, (ii) a client name 410, (iii) a client address 412, (iv) billing information 414 that specifies how the client is to be charged for surveys conducted on its behalf, and (v) a preferred method of delivering survey results 416.

The data stored in the client database 46 may be received from the client device 14 (FIG. 1). For example, an entity may use the client device 14 to access a site on the World Wide Web ("Web") where the entity registers to become a client. The appropriate data would be requested and entered via that site, communicated to the controller 12 (FIG. 1), and stored in a newly-created entry of the client database 46.

Figure 5:
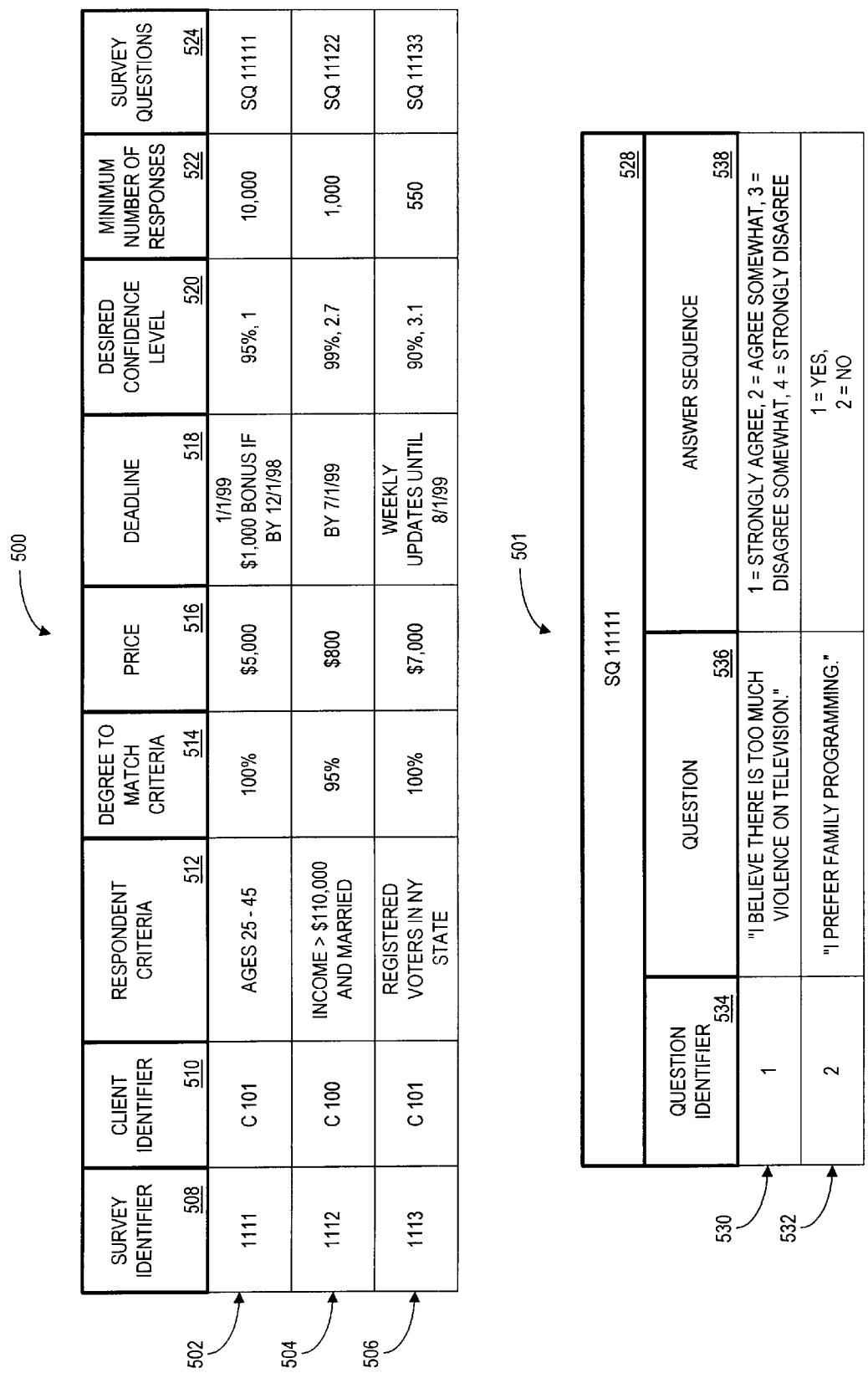
FIG. 5 is a schematic illustration of a survey database of the controller of FIG. 3.

Referring to FIG. 5, tables 500 and 501 collectively represent an embodiment of the survey database 48 of FIG. 3. The table 500 includes rows 502, 504 and 506, each of which represents an entry that defines a survey that is to be conducted on behalf of a client. In particular, each entry includes (i) a survey identifier 508 for uniquely identifying the survey, (ii) a client identifier 510 for indicating the client on whose behalf the survey is conducted, (iii) respondent criteria 512 that specify the types of respondents whose responses are desired, (iv) a degree 514 to which the respondent must match the specified respondent criteria, (v) a price 516 paid by the client in return for having the survey conducted, (vi) a deadline 518 by which the responses to the survey must be assembled and provided to the client, (vii) a desired confidence level 520 of the survey results which includes a percentage and an offset, (viii) a minimum number of responses 522, and (ix) an indication of the survey questions 524.

The desired confidence level includes a percentage that is the probability that the true average associated with a question is within a predefined interval. The interval is in turn defined as an interval from one offset less than the sample average (defined by the average of the received responses) to one offset greater than the sample average. For example, if a survey question is "What is the best age to start having children?", then the sample average (based on the received responses) might be the age "27". If the confidence level percentage is 95% and the offset is 1.0 years, then the desired confidence level is achieved if it is determined that the true average age has a 95% probability of being in the interval from "26" (27−1) to "28" (27+1). Calculating a confidence level is described in "Introduction to Statistics", by Susan Wagner, published by Harper Perennial, 1992.

A table such as the table 501 would typically exist for each entry of the table 500. The table 501 includes an identifier 528 which corresponds to an indication of the survey questions of the table 500 and which uniquely identifies the survey questions represented thereby. The table 501 also includes rows 530 and 532, each of which defines a survey question. In particular, each entry includes (i) a question identifier 534 that uniquely identifies the survey question of the table 501; (ii) a question description 536, which may be in the form of text, graphical image, audio or a combination thereof; and (iii) an answer sequence 538 defining possible responses which the respondent may select, and an order of those responses. In certain embodiments of the present invention, the survey question may not have an answer sequence, but may instead allow the respondent to provide a "free form" response comprising, for example, text he types or audio input he speaks. For example, for a survey question "What is your favorite name for a boy?" the respondent may be allowed to type his favorite name in his response.

As illustrated above, the respondent criteria specify the types of respondents whose responses to the survey questions are desired. In another embodiment, each survey question may include associated respondent criteria. Thus, different questions of a survey could be targeted to differed types of respondents. Similarly, each survey question may also specify a deadline, a desired confidence level, and/or a minimum number of responses.

Figure 6:
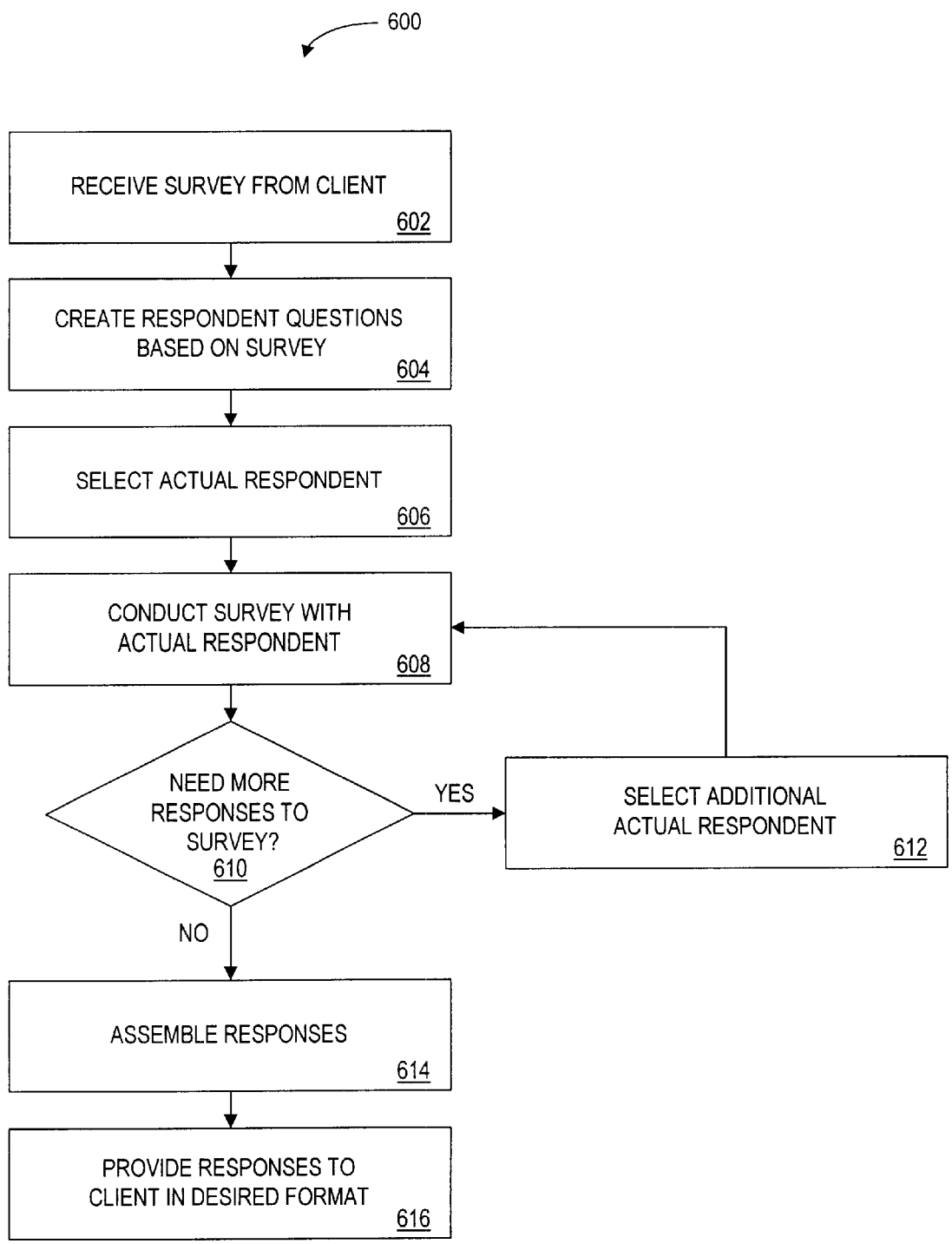
FIG. 6 is a flow chart illustrating a method for conducting a survey on behalf of a client.

Referring to FIG. 6, a method 600 is performed by the controller 12 (FIG. 1) for conducting a survey on behalf of a client. The controller 12 receives a survey from the client (step 602). The survey includes survey questions as well as other data such as respondent criteria, indicated above with respect to FIG. 5. The survey may be received from the client device 14 (e.g. a computer accessing a site on the Web). The appropriate data would be requested and entered via that site and communicated to the controller 12 (FIG. 1). Alternatively, the survey may be entered into the controller 12 via an input device in communication therewith, as will be understood by those skilled in the art. The controller 12 creates respondent questions based on the survey questions (step 604), as is described in detail below.

Figure 7:
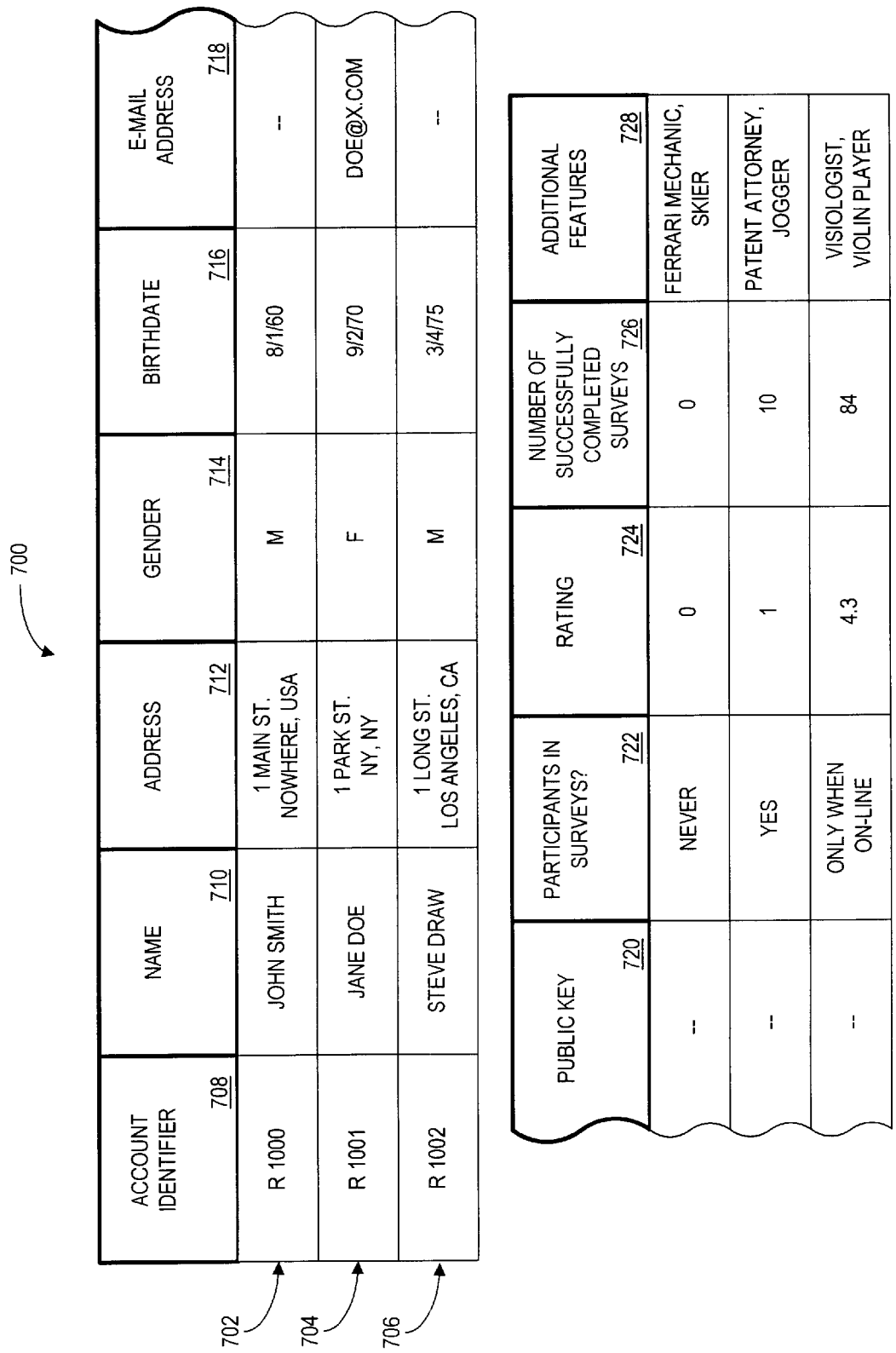
FIG. 7 is a schematic illustration of a customer account database of the controller of FIG. 3.

The controller 12, in response to a request by a consumer to participate in a survey, screens the consumer, as described more fully in FIG. 7, to select an actual respondent for a survey (step 606). The survey is then conducted with the actual respondent (step 608) in a manner described in detail below. If still more responses are required (step 610), as may be true to satisfy a minimum number of respondents or a desired confidence level, then additional actual respondents are selected (step 612) from the pool of respondents wishing to participate in the survey. It may also be necessary to select additional actual respondents if the previous respondents do not represent an accurate sampling of a desired population or if too many of the responses received are fraudulent. It may also be necessary to select additional actual respondents based on responses received. For example, a majority of Connecticut respondents may provide a certain response, so additional actual respondents from New England are desired. Additional actual respondents may also be selected if a desired set of responses is not achieved. For example, a client may require that at least 80% of respondents provide the same response. If there is no such majority response, additional actual respondents are desired. If no more responses are required, then the responses are assembled (step 614) and provided to the client in a desired format (step 616).

Referring to FIG. 7, a table 700 represents an embodiment of the customer account database 50 of FIG. 3. The table 700 includes rows 702, 704 and 706, each of which represents an entry of the customer account database 50. Each entry defines a customer profile of a party pre-registered to participate in responding to surveys. The pre-collected information may be provided by a consumer's account, such as an account with a cable television provider or other types of accounts, including bank accounts or casino-based frequent player accounts or online service accounts. A consumer may also be solicited to participate in responding to a survey. In this case, the consumer will complete a consumer questionnaire requesting the various information necessary to complete an entry of the customer account database 50. The consumer questionnaire may be provided and completed through the television transmission network and the respondent devices 16, 18 and 20. For example, a consumer may use a respondent device 16, 18 and 20 to access a channel on the television 22 where the consumer registers (e.g. to become a customer of a survey service), or a consumer may send in a written registration form (e.g. included in his payment bill). The appropriate data would be requested and entered via that television, communicated to the controller 12 (FIG. 1), and stored in a newly-created entry of the customer account database 50. Additional information may be stored concerning a consumer by tracking the consumer's television-viewing habits. In addition, the customer account database may also be stored in an entry storage device 34 of the set-top controller 26.

Each entry includes (i) an account identifier 708 that uniquely identifies the customer, (ii) a customer name 710, (iii) a customer address 712, (iv) the gender 714 of the customer, (v) the birth date 716 of the customer, (vi) an electronic mail address 718 of the customer, (vii) a public key 720 of the customer for use in cryptographic applications, (viii) an indication of whether the customer is willing to participate in surveys 722, (ix) a rating 724 that is based on past survey participation of the customer, (x) the number of successfully completed surveys 726, and (xi) additional features 728 of the customer profile. Those skilled in the art will understand that many different types of information may be stored for each customer profile.

In the alternative, an entry of a consumer profile may have a unique account identifier that identifies a consumer of a household. In one embodiment a household comprises a group of consumers that reside at the residence where the respondent device is located.

Figure 8A:
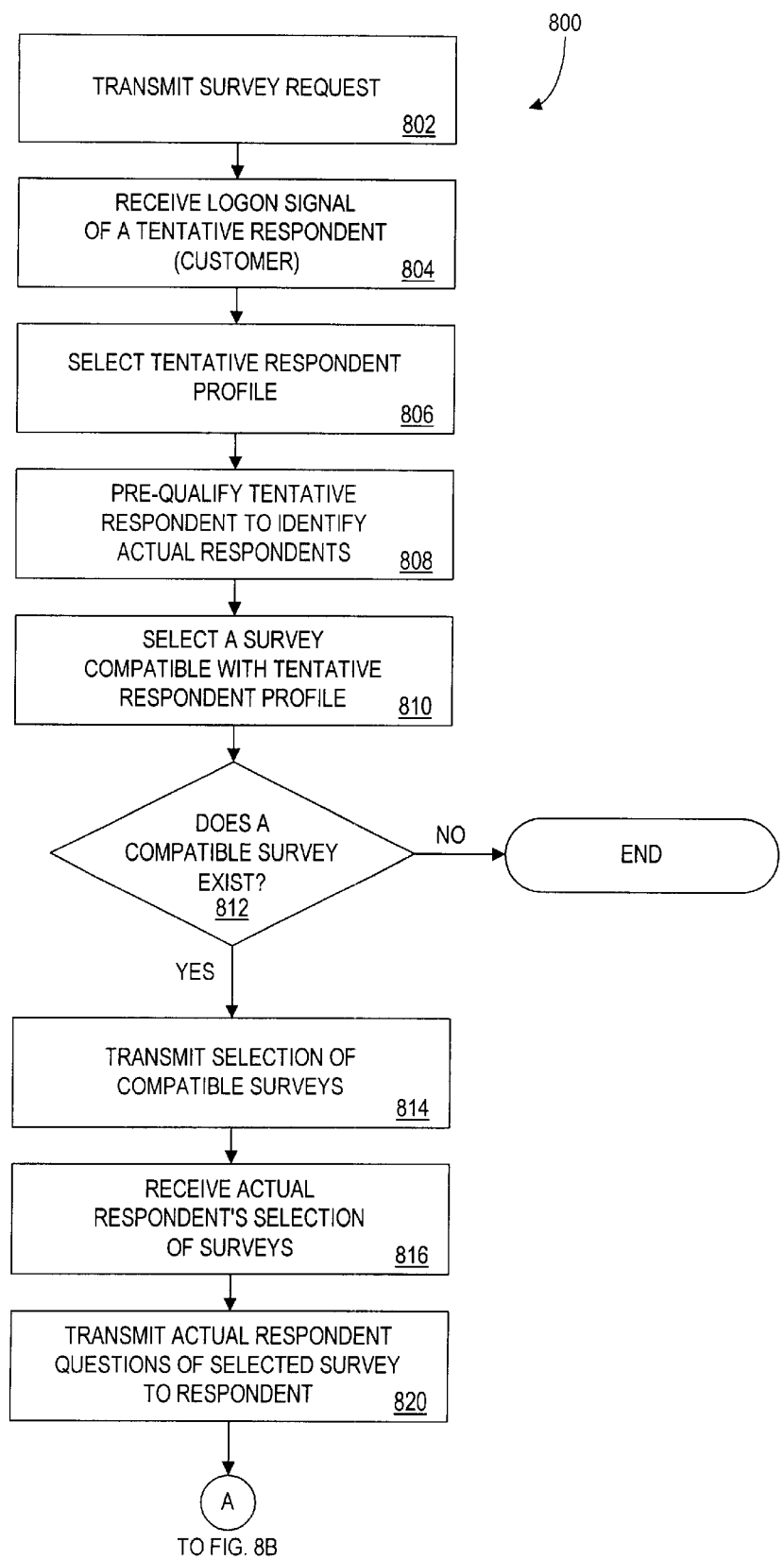
FIGS. 8A and 8B are a flow chart illustrating a method for directing a respondent that is participating in a survey.
Figure 8B:
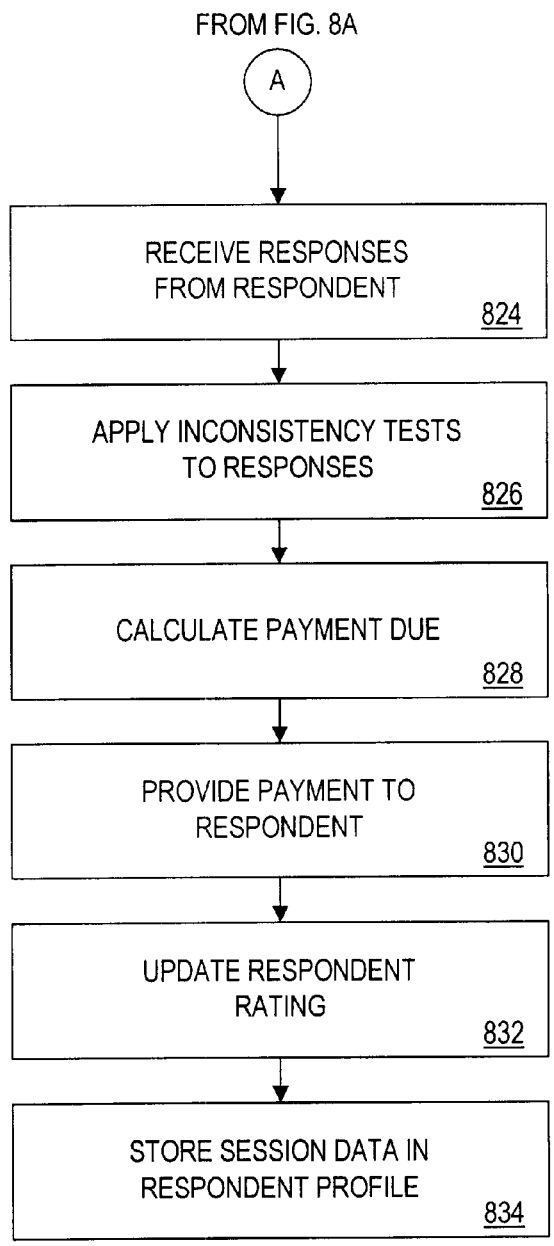

Referring to FIGS. 8A and 8B, a method 800 is performed by the controller 12 (FIG. 1) in directing a respondent that is participating in a survey. The method 800 is primarily directed to a respondent that communicates ("logs on") with the controller 12 through the television transmission network or another device in communication with the controller 12. For example, the respondent transmits a log-on signal to the controller 12 that indicates that a tentative respondent wishes to participate in a survey.

The controller 12 transmits a survey request to a plurality of respondents (e.g., subscribers of a cable television service) via a television transmission network (step 802). The survey may be transmitted in an encoded format to each respondent as a dedicated survey channel wherein a respondent requests to participate in a survey from the survey channel. A survey channel may be a channel similar to known "pay-per-view" channels. In the alternative, the option to participate in a survey may be integrated with the television programming. For example, a commercial may include an option for the respondent to participate in a survey related to the product or service being advertised. The controller may prompt the respondent to respond to a survey. The respondent may elect to participate in the survey or not. The controller may also solicit the respondent during a regularly scheduled television program. In another alternative, the respondent may also request to participate in a survey by selecting for example from a menu initiated by the respondent.

The controller 12 receives the log-on signal (step 804) that indicates that a customer (a potential respondent) wishes to participate in a survey. In response, the controller 12 selects the customer profile corresponding to the indicated customer (step 806). For example, the log-on signal may include an account identifier that indicates an entry of the customer account database 50 of FIG. 3. The entry in turn defines a customer profile that serves as a profile of a customer that chooses to become a respondent of a survey.

Although the tentative respondents may meet the respondent criteria, it can be desirable to assure further that the respondents meet other criteria. For example, a respondent profile may only include data volunteered by each respondent with no assurance that the data is accurate. Accordingly, the tentative respondents are prequalified (step 808) in order to identify actual respondents that will participate in the survey. Prequalifying the tentative respondents may include transmitting qualification questions to each tentative respondent. The qualification questions may define, for example, a test of English language competency or a test for familiarity with luxury vehicles if the survey to be administered requires it. Responses to the qualification questions are received, and a qualification test is applied to the responses to generate a qualification test result. Based on the qualification test result, an actual respondent is selected (e.g. respondents with at least a particular level of English language competency) to participate in the survey. The qualifying test may be presented each time the respondent participates in a survey. In the alternative, the qualifying test may be presented the first time the respondent participates in a survey after registering with the results from the qualifying test to be stored in the customer account database 50.

The controller 12 then selects a survey that is compatible with the respondent profile (step 810). For example, a particular survey may be directed to parties between the ages of twenty-five and forty-five. This survey would be compatible if the corresponding birth date of the respondent profile indicates that the respondent is between the ages of twenty-five and forty-five. The controller may select a plurality of compatible surveys and present the customer with a list of surveys in which the actual respondent may participate (i.e. compatible surveys). In the alternative, the controller may select a survey and transmit the survey to the actual respondent wherein the respondent may agree to respond to the survey selected by the system.

The controller 12 transmits survey data and selected predetermined parameters (e.g. number of survey questions) of the survey to the consumer and the consumer can, for example, select a survey. In one embodiment, the consumer may select a survey based on the reputation of the survey provider, for example, the customer chooses to take surveys given by manufacturers or marketers who pay out the greatest amount of money or payment. Other criteria that the consumer may consider in selecting a survey may be the subject matter of the survey, the number of questions in the survey, and/or an estimated amount of time to answer the survey.

If at least one compatible survey exists that the actual respondent may participate in (step 812), the controller 12 transmits a list or selection of compatible surveys via the television transmission network to the actual respondent (step 814). The controller 12 receives the actual respondent's selection from the list of compatible surveys (step 816). The respondent questions of the selected survey are then transmitted to the respondent (step 820). As described in detail below, the respondent questions of a survey are based on (but may differ from) corresponding survey questions. The controller 12 receives responses from the respondent (step 824) and applies one or more inconsistency tests to the responses (step 826). The steps 824 and 826 may be repeated, as necessary. Each of the steps 824 and 826 are described in further detail below.

In one embodiment the controller 12 may transmit all respondent questions and then await responses thereto. In another embodiment the controller 12 may transmit respondent questions one at a time and await a response thereto before transmitting the next respondent question.

In the real-time embodiment, the respondent device is capable of transmitting responses back to the controller 12 substantially simultaneously with the respondent's act of responding. The upstream data flow is possible in real-time via (i) twisted pair cable, (ii) coaxial cable, (iii) fiber optic cable, (iv) telephone, (v) personal digital assistant (PDA), or (vi) a combination of any of these. When the responses are transmitted back to the controller in real-time, the fraud tests may also be practiced in real-time. For example, the controller can discontinue transmission of survey questions if fraud is detected. Each survey question can be tested for fraud immediately after it has been answered and before the next question is transmitted in the real-time embodiment. The real-time embodiment also provides flexibility in administering questions, i.e. a question can change based on the answer to the previous question.

In the batch-process embodiment, the consumer's set-top controller 26 stores the responses to the survey questions and transmits the responses back to the controller 12 at a subsequent time. The responses are evaluated as a batch when they are received by the controller 12. The fraud-protection tests are applied after the batch has been received. The batch of responses can correspond either to a part of the survey or to the whole survey. If it corresponds to only a part of the survey, then the fraud tests can be performed after each set of responses is received and the controller 12 can determine whether or not to transmit the next set of survey questions to the consumer. The batch-process embodiment enables the invention when only limited transmission technologies are available.

The latter-described embodiment is advantageous when certain respondent questions are to be only transmitted depending on the responses received to previous respondent questions. Accordingly, it will be understood by those skilled in the art that when reference is made to transmitting questions and receiving responses, either embodiment is acceptable.

After all responses have been received from the respondent, the controller 12 calculates the payment due (step 828) based upon a predetermined criteria defined by the client. For example, the payment may be based on (i) the time of activation and deactivation, i.e., how long the consumer spends answering the survey question, (ii) the number of questions answered, (iii) whether the questions were displayed in the "picture-in-picture" mode or the full screen mode, (iv) the confidence level of the completed survey, (v) the rating of the respondent, or (vi) any combination thereof. In one embodiment, the payment for displaying the survey in the "picture-in-picture" mode is less than displaying the survey in the "full-screen" mode.

After the payment has been determined, the controller provides that payment to the respondent (step 830). In addition to several methods for transferring payments described in the above-referenced parent application, the payment method can be (i) crediting the consumer's cable television bill, or (ii) any conventional method of payment, e.g., electronic funds transfer, crediting a credit card, digital cash, etc.. Those methods are applicable to receiving the payment from the client as well as rendering the payment to respondents. In addition, the respondent rating is updated (step 832) to reflect the responses received during the session, and other session data is stored in the corresponding respondent profile (step 834). For example, the respondent rating may be selected from a set of predefined ratings: "gold" if he answered more than fifty surveys successfully and without a fraud signal being generated, "normal" otherwise. Other types of ratings and rating criteria will be understood by those skilled in the art.

Referring to FIG. 9, a table 900 represents an embodiment of the certification question database 52. The certification question database 52 includes entries 902 and 904, each of which defines a certification question (a question for determining whether a respondent is a computer, is not paying attention or otherwise may not provide responses that are useful to the client). The use of certification questions in surveys conducted remotely is advantageous because their use can help detect responses that originate from computers or humans not paying attention to the question. Without such questions, it would be difficult to determine whether received responses constituted useful data.

Each entry includes (i) a certification question identifier 906 that uniquely identifies the certification question, (ii) a certification question description 908 which may include text of the question, (iii) an answer sequence 910 that defines possible responses which the respondent may select and an order of those responses, and (iv) the proper answer 912 to the certification question.

The certification question database 52 is updated periodically so that new certification questions are added. Older certification questions may also be deleted periodically if desired. Adding new certification questions makes it extremely difficult for an unscrupulous party to design a computer program that automatically provides the proper answers to certification questions. There can be certification questions which stay the same, but for which the proper response changes frequently (e.g. "what was the big news event today?"). Certification questions need not be an interrogative but nonetheless invite a reply (e.g. "Answer (b) to this question").

Referring to FIG. 10, the table 900 which defines certification questions and the table 501 which defines survey questions are illustrated again with an exemplary set of respondent questions generated. Each respondent question is created based on one or more survey questions, one or more certification questions, or a combination thereof.

A table 1000 represents a plurality of respondent questions. The table 1000 includes entries 1002, 1004, 1006, 1008, 1010 and 1012, each defining a respondent question. Each entry includes (i) a respondent question identifier 1014 that uniquely identifies the respondent question, (ii) a respondent question description 1016, and (iii) an answer sequence 1018.

A plurality of respondent questions may be based on the same survey question or certification question. For example, the entries 1004 and 1010 represent respondent questions that are each based on the certification question represented by the entry 902. If a plurality of respondent questions is based on the same survey question or certification question, then the corresponding responses should match if the respondent is human and paying attention. As used herein, responses are deemed to match if they each define the same answer, even if the answer sequences of the corresponding questions are not identical. For example, if a first answer sequence is "1=yes, 2=no" and a second answer sequence is "1=no, 2=yes", then the responses match if both responses are "no" (or if both responses are "yes"). In addition, if the respondent questions are based on a certification question, then the responses should also match the corresponding proper answer of the certification question. An inconsistency test would be applied to assure that the responses to certification-based questions match the corresponding proper answer of the certification question.

A respondent question may include an answer sequence that is identical to or different from the answer sequence of the survey question or certification question on which it is based. For example, the entry 1002 represents a respondent question that is based on the survey question represented by the entry 532. The answer sequence defined by the entry 1002 is identical to the answer sequence defined by the entry 532. Similarly, the entry 1008 represents a respondent question that is also based on the survey question represented by the entry 532. However, the answer sequence defined by the entry 1008 is different from the answer sequence defined by the entry 532. Thus, a respondent that provides random or otherwise meaningless responses will be unlikely to provide responses that are consistent. For example, if a respondent always selects the first response of the answer sequence, he cannot provide consistent responses to a plurality of respondent questions with different answer sequences.

As described below, a respondent question based on a certification question may be created and transmitted to a respondent as are respondent questions that are based on survey questions. In some embodiments it can be desirable to transmit such certification-based respondent questions only after receiving an indication (hereinafter a "warning sign") that the responses may be from a computer or from a human that is not paying attention.

Figure 11:
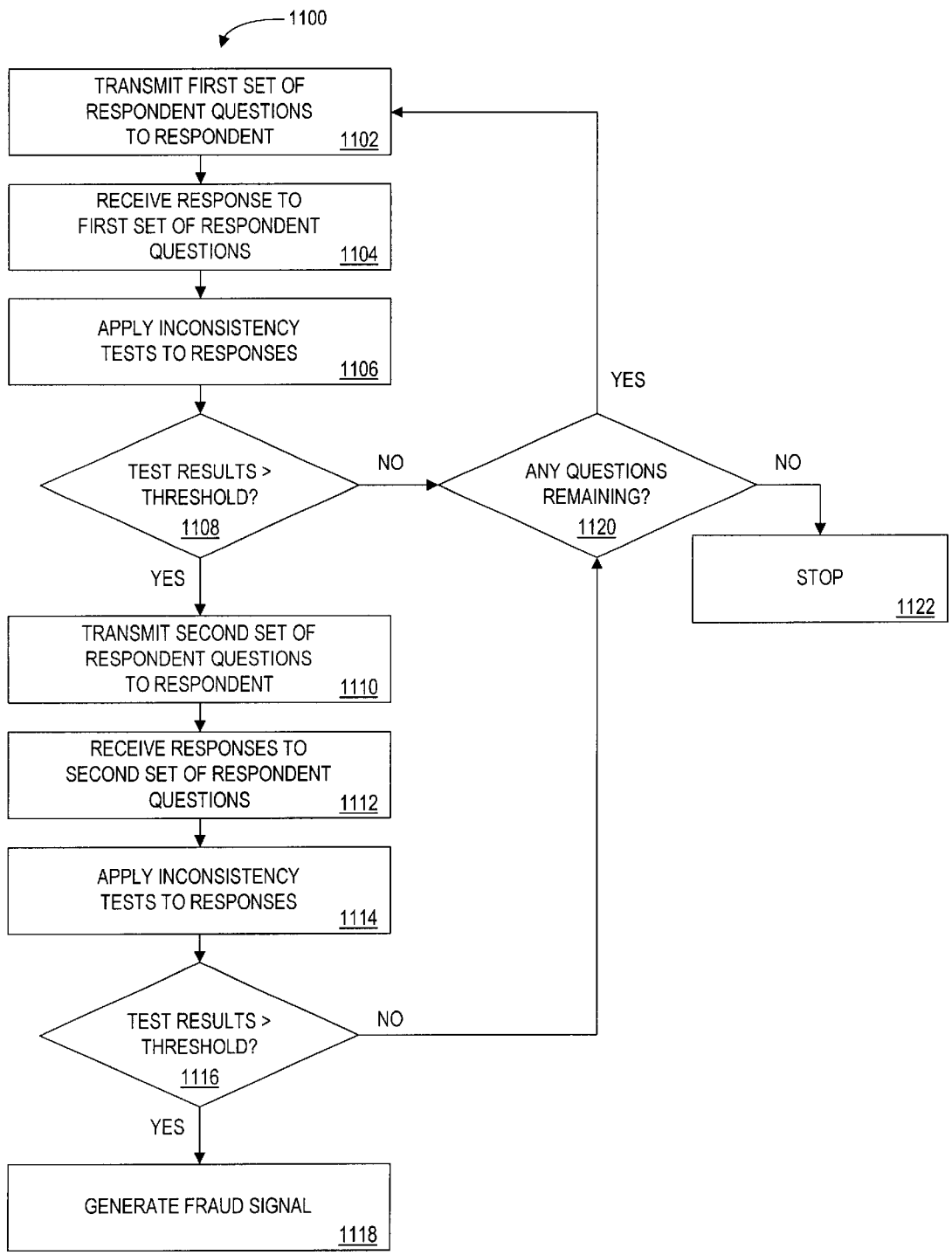
FIG. 11 is a flow chart illustrating a method for interacting with a respondent in conducting a survey.

Referring to FIG. 11, a method 1100 is performed by the controller 12 (FIG. 1) in transmitting respondent questions to a respondent and receiving responses to those respondent questions. The controller 12 transmits a first set of respondent questions to the respondent (step 1102) and receives responses to the first set of respondent questions (step 1104). The controller applies an inconsistency test to the responses to generate an inconsistency test result (step 1106). Several types of inconsistency tests are described in detail below.

Based on the inconsistency test result, it is determined whether a warning sign is indicated (step 1108). For example, it may be determined whether the inconsistency test results (e.g. number of inconsistent answers) are greater than a predetermined threshold. If so, then a second set of respondent questions are transmitted to the respondent (step 1110), and corresponding responses thereto are received (step 1112). The controller 12 then applies an inconsistency test to these responses to generate another inconsistency test result (step 1114). If this inconsistency test result indicates a warning sign (step 1116), then a fraud signal is generated (step 1118). As described below, various actions may be performed upon generation of a fraud signal.

If both inconsistency test results do not indicate a warning sign, then it is determined whether there are any respondent questions remaining (step 1120). If so, then those respondent questions are transmitted to the respondent, as described above (step 1102). Otherwise, the controller stops transmitting respondent questions to the respondent (step 1122).

Figure 12A:
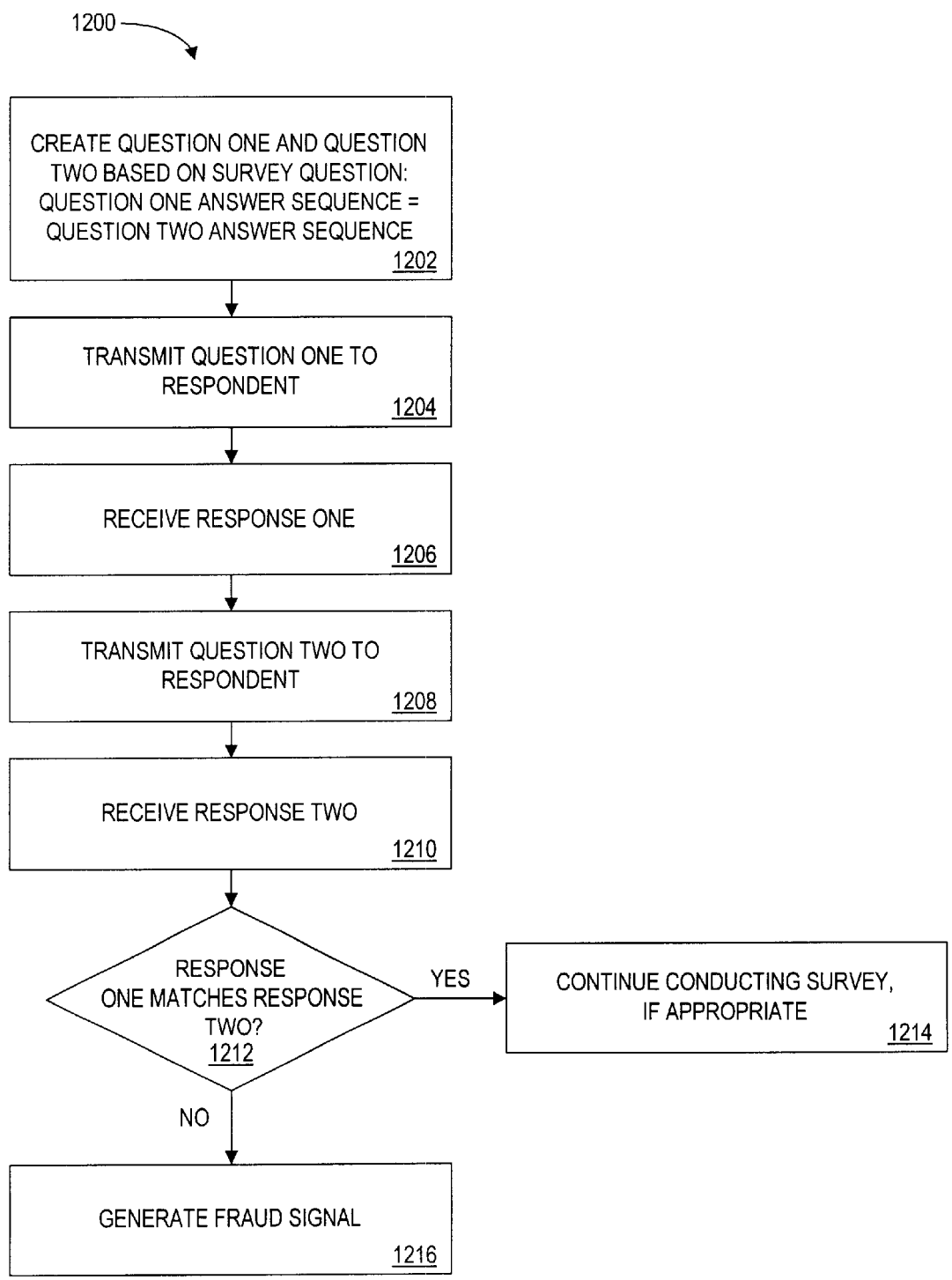
FIG. 12A is a flow chart illustrating a first method for applying an inconsistency test to responses.

Referring to FIG. 12A, the controller 12 (FIG. 1) may apply a first inconsistency test to responses by comparing the responses of identical respondent questions. At step 1202 of the method 1200, the controller creates a first question ("question one") and a second question ("question two") based on a single survey question. Question one and question two define the same answer sequence. Those skilled in the art will understand that question one and question two may instead be based on a certification question.

Question one is transmitted to the respondent (step 1204), and a corresponding response ("response one") is received (step 1206). Similarly, question two is transmitted to the respondent (step 1208), and a corresponding response ("response two") is received (step 1210). If response one matches response two (step 1212), then the controller continues conducting the survey, if appropriate (step 1214). Otherwise, a fraud signal is generated (step 1216).

Figure 12B:
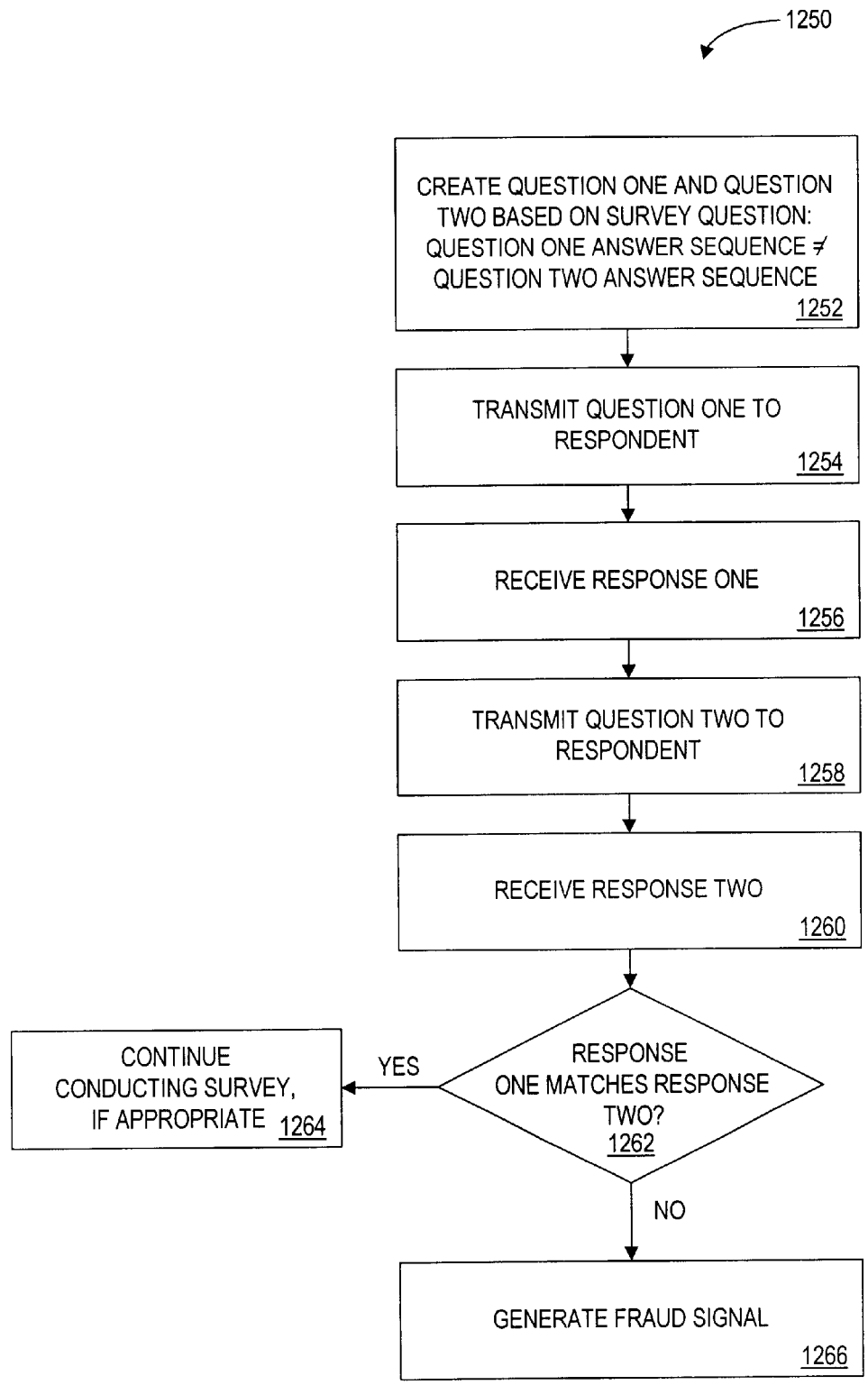
FIG. 12B is a flow chart illustrating a second method for applying an inconsistency test to responses.

Referring to FIG. 12B, the controller 12 (FIG. 1) may apply a second inconsistency test to responses by comparing the responses to respondent questions that are based on the same survey question but that have different answer sequences. At step 1252 of the method 1250, the controller creates a first question ("question one") and a second question ("question two") based on a single survey question. Those skilled in the art will understand that question one and question two may instead be based on a certification question.

Question one is transmitted to the respondent (step 1254), and a corresponding response ("response one") is received (step 1256). Similarly, question two is transmitted to the respondent (step 1258), and a corresponding response ("response two") is received (step 1260). If response one matches response two (step 1262), then the controller continues conducting the survey, if appropriate (step 1264). Otherwise, a fraud signal is generated (step 1266).

Figure 13:
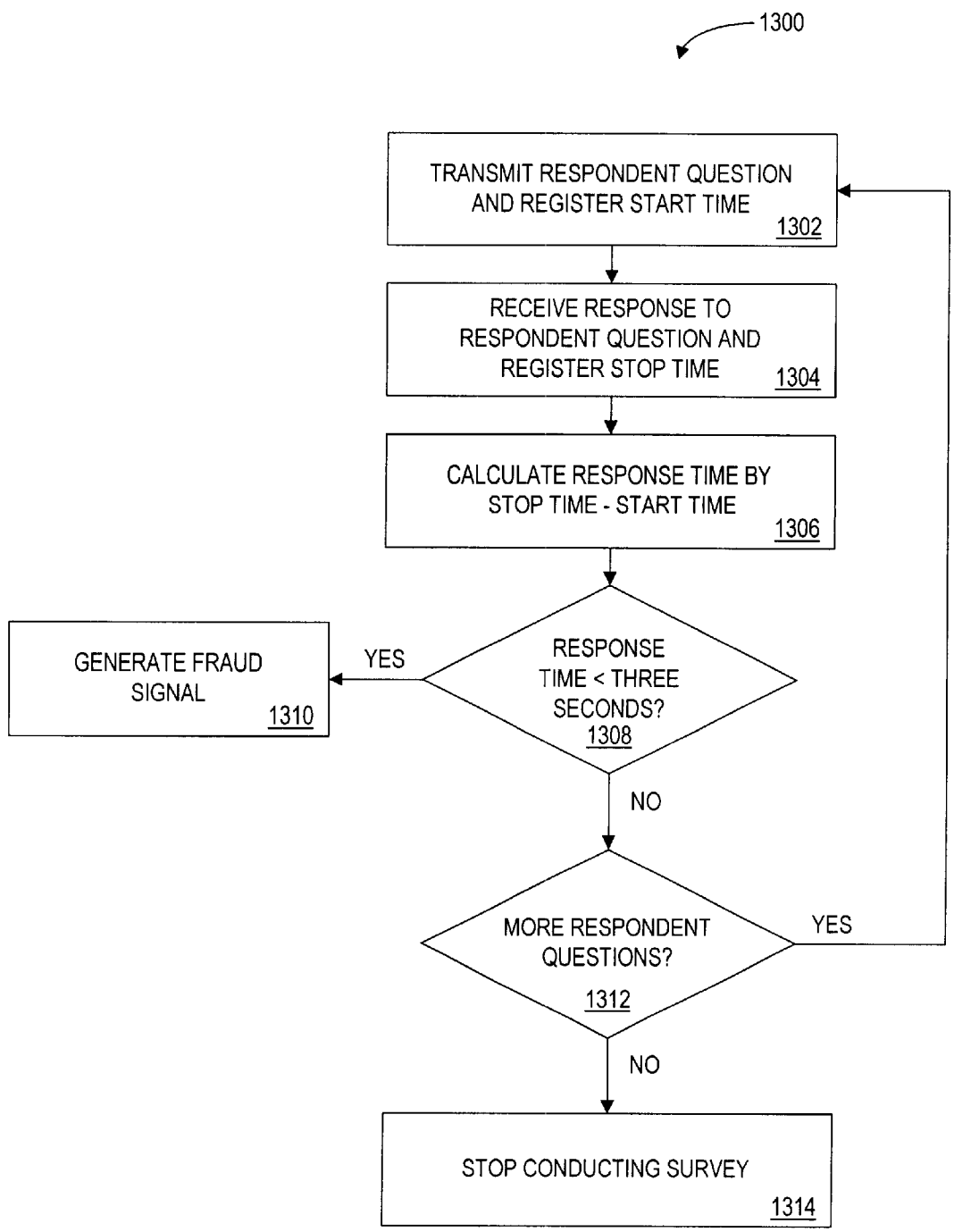
FIG. 13 is a flow chart illustrating a third method for applying an inconsistency test to responses.

Referring to FIG. 13, a method 1300 is performed by the controller 12 (FIG. 1) in applying a third inconsistency test to responses. In particular, the controller 12 measures the time it takes a respondent to provide a response. If the response is provided too quickly, it likely indicates that the respondent has not read the question before responding or that the respondent is a computer.

The controller 12 transmits a respondent question and registers the time thereof, called a "start time" (step 1302). The start time represents the time the respondent question is transmitted. Alternatively, the start time may represent the time the respondent question is received by the respondent device or the time the respondent question is read by the respondent. A response to the respondent question is subsequently received, and the time of receipt ("stop time") is registered (step 1304). The stop time may similarly represent the time the response is received, the time the response is transmitted by the respondent device, or the time the respondent provided the response. The response time of the respondent is calculated as the difference between the stop time and the start time (step 1306). The response time is typically a measure of the time between the respondent reading a question and providing a response thereto. If the response time is less than a predetermined threshold (step 1308), then a fraud signal is generated (step 1310) since it is highly unlikely that a human could read the question and provide a meaningful response in such a short time. Although the predetermined threshold illustrated in FIG. 13 is the exemplary value "three seconds", those skilled in the art will understand that other values may be used. Otherwise, it is determined whether there are more respondent questions (step 1312). If so, then the controller 12 continues transmitting those respondent questions (step 1302). If not, then the controller 12 stops conducting the survey with this respondent (step 1314).

Figure 14A:
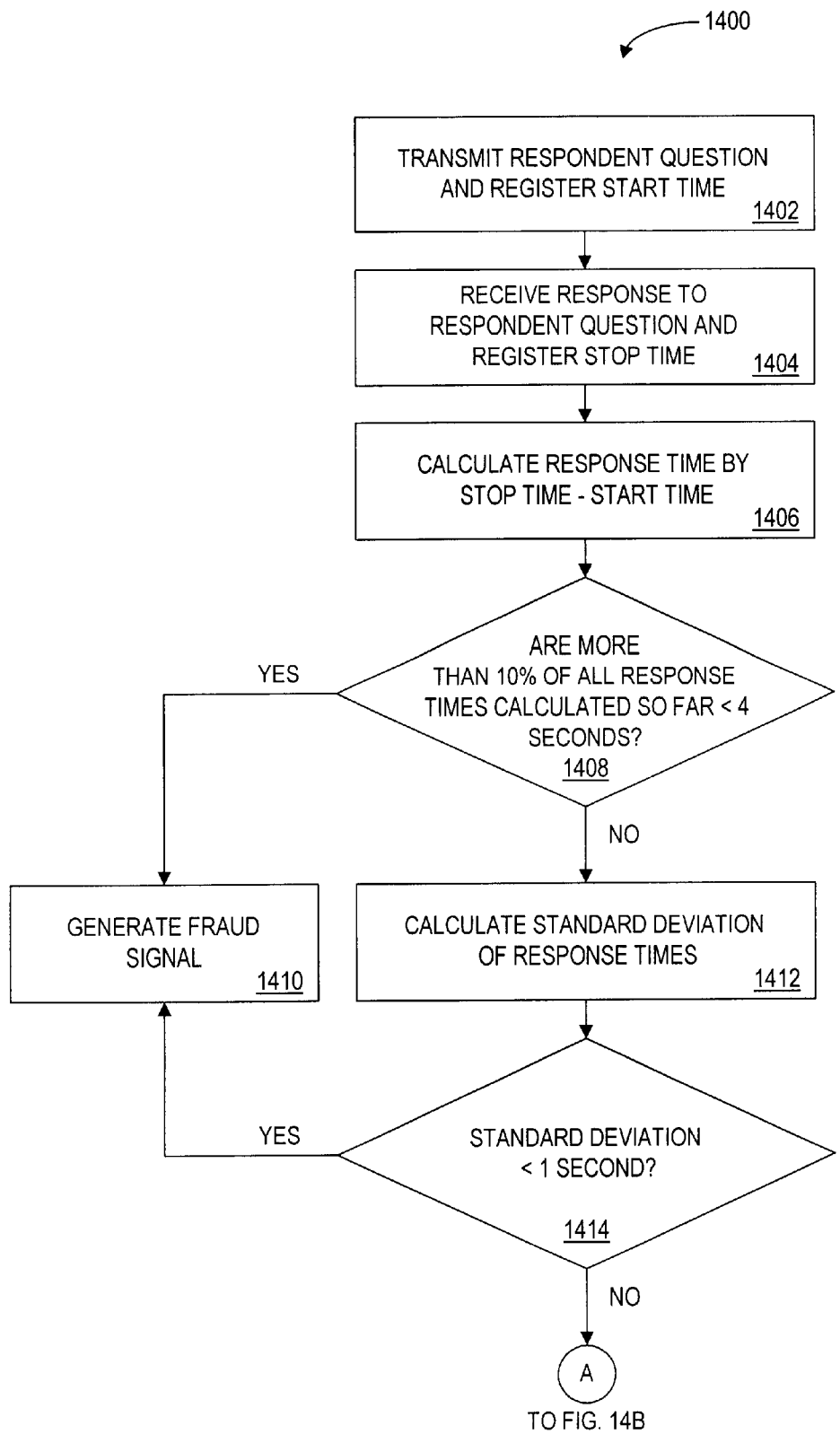
FIGS. 14A and 14B are a flow chart illustrating a fourth method for applying an inconsistency test to responses.
Figure 14B:
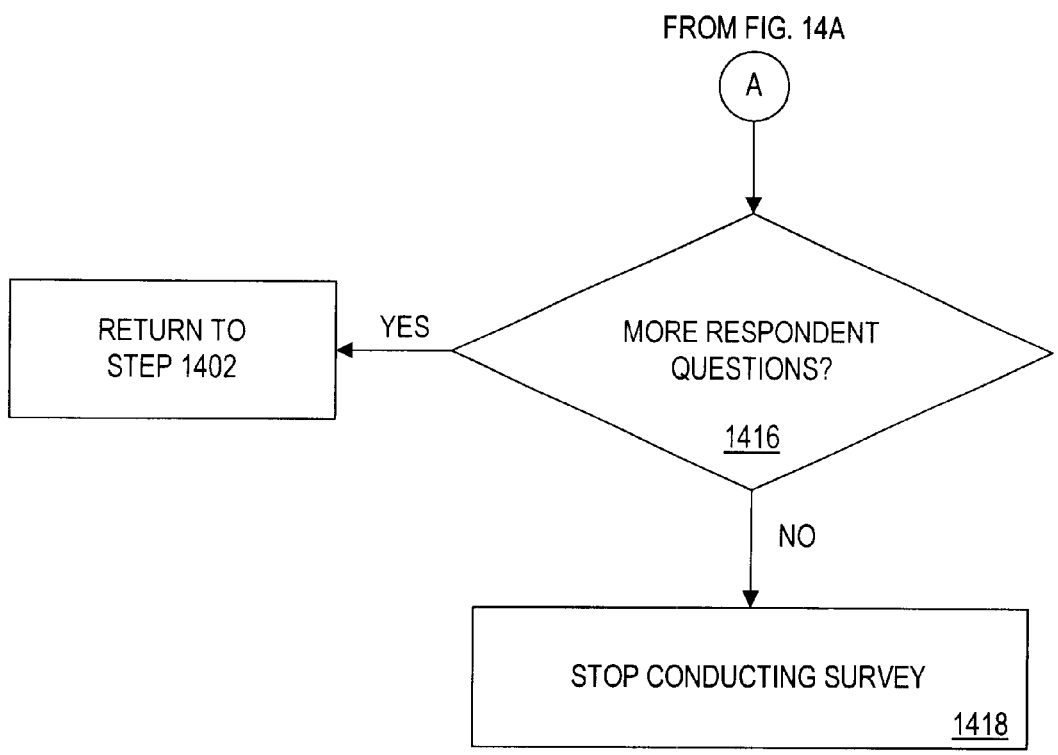

Referring to FIGS. 14A and 14B, a method 1400 is performed by the controller 12 (FIG. 1) in applying a fourth inconsistency test to responses. In particular, the controller 12 measures the time it takes a respondent to provide responses to a plurality of respondent questions. If the response time does not vary significantly, then it likely indicates that the respondent is a computer or a human that is not paying attention.

The controller 12 transmits a respondent question and registers the start time (step 1402). Then, a response to the respondent question is received, and the stop time is registered (step 1404). The response time is calculated as the difference between the stop time and the start time (step 1406). If more than a predetermined percentage of the response times are less than a predetermined threshold (step 1408), then a fraud signal is generated (step 1410). Although in FIG. 14 exemplary values are illustrated for the predetermined percentage (10%) and the predetermined threshold (four seconds), those skilled in the art will understand that other values may be used as desired. Those skilled in the art will also understand that a respondent device, rather than the controller 12, may register the start time and stop time and calculate the response time.

Otherwise, the standard deviation of the response times is calculated (step 1412). If the standard deviation is below a predetermined threshold (step 1414), then a fraud signal is generated (step 1410). Otherwise, it is determined whether there are more respondent questions to be answered (step 1416). If so, those respondent questions are transmitted to the respondent (step 1402). If not, then the controller 12 stops conducting the survey with this respondent (step 1418).

Figure 15:
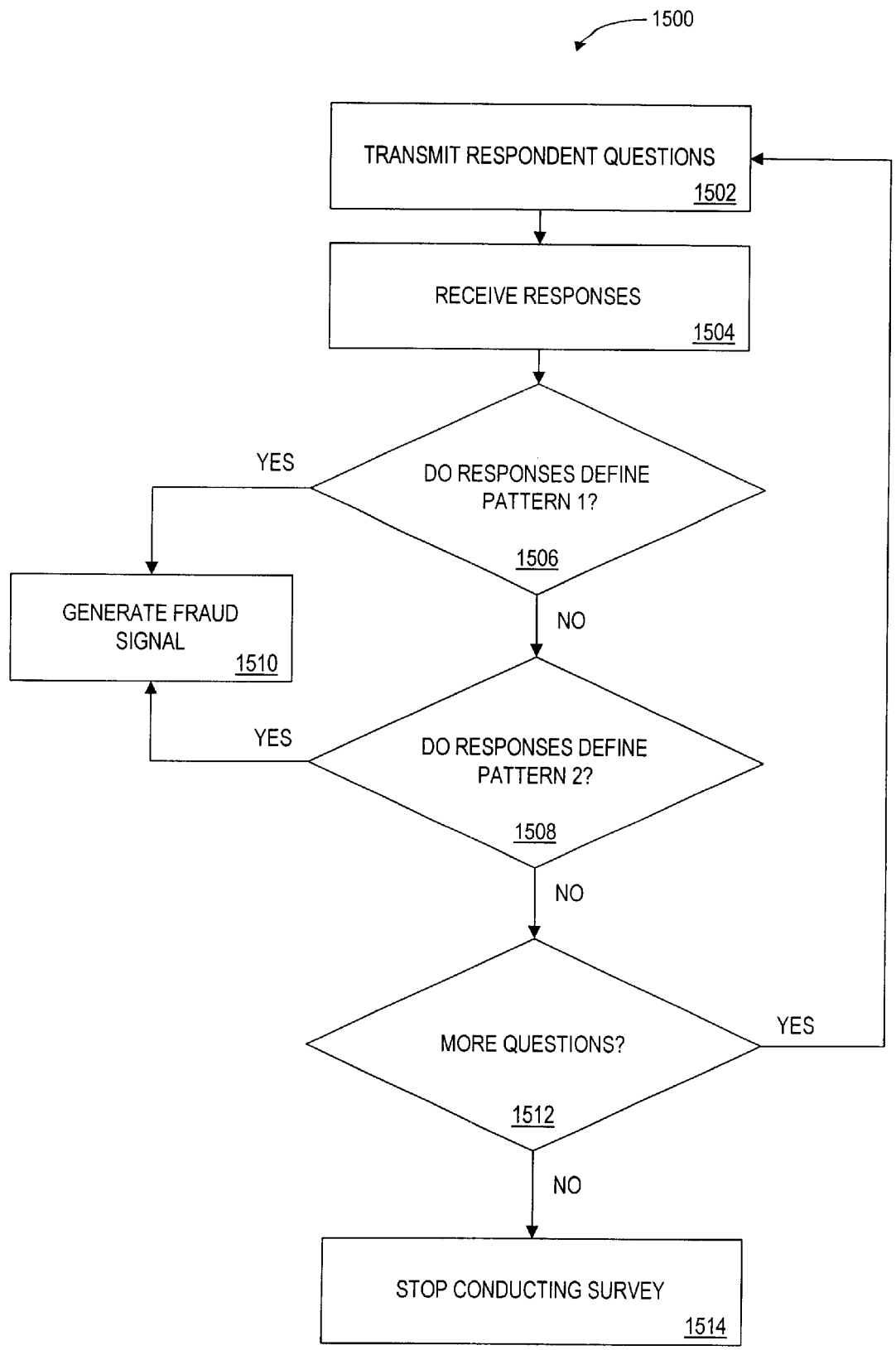
FIG. 15 is a flow chart illustrating a fifth method for applying an inconsistency test to responses.

Referring to FIG. 15, a method 1500 is performed by the controller 12 (FIG. 1) in applying a fifth inconsistency test to responses. In particular, the controller 12 determines whether the responses define a predetermined pattern (e.g. all responses are the first response choice or the responses alternate between the first 2 choices). If the responses define a predetermined pattern, then it likely indicates that the respondent is a computer or a human that is not paying attention.

The controller 12 transmits respondent questions (step 1502), and receives responses thereto (step 1504). If the responses define a first pattern (step 1506) or define a second pattern (step 1508), then a fraud signal is generated (step 1510). The controller may test to see if the responses define any number of predetermined patterns. If there are more respondent questions (step 1512), then those respondent questions are transmitted to the respondent (step 1502). Otherwise, the controller 12 stops conducting the survey with this respondent (step 1514).

When a fraud signal is generated, the controller may ignore the responses received from the corresponding respondent. In addition, if a fraud signal is generated, payment to the respondent may be reduced or eliminated, the respondent may be sent a message of reprimand, and/or the respondent may be barred from future participation in surveys. The rating of a respondent may likewise reflect the generation of a fraud signal. Similarly, the client may be informed that certain responses were accompanied by a fraud signal. The client may be offered a reduced price if he accepts these responses in the assembled survey results. In one embodiment, payment due to the respondent accrues until it is paid to the respondent at predetermined times (e.g. once per month). In this embodiment, the fraud signal can prevent accrued payment from being paid to the respondent. Generation of a fraud signal can thus prevent the respondent from receiving the payment from several surveys. Accordingly, the respondent has a strong incentive to avoid actions that may generate a fraud signal. It can be further desirable to "mix" questions from a plurality of surveys and present those questions to a respondent. Thus, the respondent may participate in a plurality of surveys concurrently. This is advantageous in that it makes it more difficult to develop a program that can repeatedly respond to a single survey.

Figure 16:
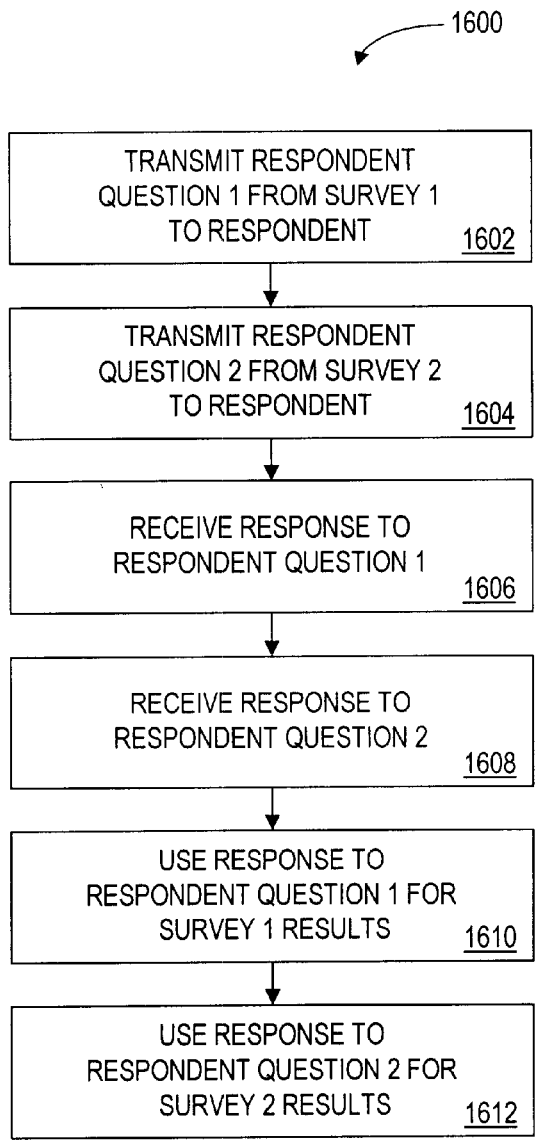
FIG. 16 is a flow chart illustrating a method for creating a set of respondent questions from the survey questions of a plurality of surveys.

Referring to FIG. 16, a method 1600 is performed by the controller 12 (FIG. 1) in directing a respondent to participate in more than one survey substantially simultaneously. In the flow chart of FIG. 16, a respondent may participate in two surveys. Of course, more than two surveys are possible as well. A plurality of surveys may be selected based on an amount of time. For example, the respondent may specify an amount of time he would like to spend answering questions. Based on the specified amount of time, one or more surveys are used in generating respondent questions for the respondent. Alternatively, the surveys may be selected based on, for example, those surveys which must be conducted within the shortest amount of time.

The controller 12 transmits to the respondent a first respondent question from a first survey (step 1602) and a second respondent question from a second survey (step 1604). The controller 12 in turn receives a response to the first respondent question (step 1606) and a response to the second respondent question (step 1608). The response to the first respondent question is used for the first survey (step 1610), and the response to the second respondent question is used for the second survey (step 1612). As described above, the actual order of transmitting respondent questions and receiving responses may vary. For example, both respondent questions may be transmitted before any responses are received. Alternatively, the second respondent question may not be transmitted until the first response is received.

Referring to FIG. 17, a table 1700 represents an embodiment of the response database 54 (FIG. 3). The responses received from respondents are stored in the response database 54, where they may be assembled, analyzed and otherwise utilized for clients. The received responses may be stored in the response database 54 indefinitely. Alternatively, the received responses may be purged after a predetermined amount of time or when additional storage space is required.

The table 1700 includes entries 1702 and 1704, each defining a received response. In particular, each entry includes (i) a respondent identifier 1706 that identifies the respondent providing the response, and which corresponds to an account identifier of the customer account database 50 (FIG. 2), (ii) a survey identifier 1708 that identifies the survey and which corresponds to a survey identifier of the survey database 48, (iii) a question identifier 1710 that identifies the respondent question and that corresponds to a respondent question identifier as described above with reference to FIG. 10, (iv) a response 1712 received from the respondent, and (v) a date and time 1714 that the response was received.

Referring to FIG. 18, a table 1800 represents a record of the survey results database 56 (FIG. 3). The record is identified by a survey identifier 1802, which corresponds to a survey identifier of the survey database 48. The table also includes an indication of the number of responses received 1804 for this survey and an indication of the actual confidence level 1806 of the received responses. Calculating a confidence level based on a set of received responses is described in the above-cited book "Introduction to Statistics".

The table 1800 also includes entries 1808 and 1810, each of which defines the results in summary form of the responses received for a survey question. Each entry includes (i) a question identifier 1812 that uniquely identifies the survey question, and which corresponds to a survey question identifier of the survey database 48 (FIG. 3); and (ii) responses 1814 to the survey question in summary form. Many ways of summarizing the received responses will be understood by those skilled in the art. In addition, the client may specify a preferred format for the summary.

In one embodiment, each of a plurality of survey questions included in a survey may be assigned a priority. Such an embodiment allows a client to specify which types of, information he is most interested in (i.e. subjects addressed by high priority survey questions).

Referring to FIG. 19, a table 1900 represents another embodiment of the survey database 48 of FIG. 2. A table such as the table 1900 would typically exist for each entry of the table 500 (FIG. 5). The table 1900 includes an identifier 1902 uniquely identifying the survey questions represented thereby. The table 1900 also includes rows 1904 and 1906, each of which defines a survey question. In particular, each entry includes (i) a question identifier 1908 that uniquely identifies the survey question of the table 1900; (ii) a question description 1910, which may be in the form of text, graphical image, audio or a combination thereof; (iii) an answer sequence 1912 defining possible responses which the respondent may select, and an order of those responses; and (iv) a priority 1914 of the survey question.

Higher priority survey questions may be sent to more respondents than lower priority questions. For example, high priority survey questions may be transmitted to respondents, and then depending on an amount of resources remaining (e.g. money to pay respondents), a selected set of the low priority survey questions may be transmitted to a smaller number of respondents. Accordingly, it is possible that some survey questions will never be transmitted to respondents. In another embodiment, lower priority survey questions are transmitted to respondents only after a desired confidence level is reached for higher priority survey questions.

Survey questions may also be variable in that they incorporate information such as responses to other survey questions or responses by other respondents to the same survey question. For example, if a large number of respondents indicate that the color "green" is the most preferred for a new car, then additional survey questions may be directed towards the color "green". Accordingly, there may be a survey question (e.g. "Why do you like color [X]?") and adjusted questions are created based on the fact that responses indicate the color "green" is most preferred. Subsequent survey questions may be based on the responses (e.g. "Do you prefer lime green or dark green?").

In one embodiment of the present invention, the client may specify survey questions that include one or more question parameters. Corresponding respondent questions are created by a random or calculated selection of values for the question parameters. Subsequently-generated respondent questions may have values selected based on responses received for previously-generated respondent questions, in an effort to generate respondent questions that achieve a more favorable response. Accordingly, the creation of corresponding respondent questions from such survey questions is dynamic, and so these survey questions are referred to as "dynamic survey questions". Dynamic survey questions are best employed when it is difficult or impossible to know in advance which respondent questions or which parameters of questions are most desirable. In addition, the dynamic nature of respondent question generation is based on human intervention—the participation of respondents.

For example, a dynamic survey question may comprise a logo having four parameters: a foreground color, a background color, a font size and a font type. Each parameter may assume a plurality of values. Respondent questions which define logos having specific colors, font sizes and font types are created and transmitted to respondents. Based on received responses (e.g. most respondents like red and blue, few like logos that have a certain font type), additional respondent questions are created and transmitted (e.g. logos that are red and blue, and that have a well-liked font).

Certain survey questions may define comparisons to be made, so the respondent would answer based on a comparison of two (or more) things. For example, the respondent may be asked to indicate which of two logos he prefers, which of four slogans he finds least annoying, or which of three sounds he thinks is the most attention-getting. Comparison is especially advantageous when it may be difficult for a respondent to provide an evaluation in absolute terms. For example, it may be difficult for a respondent to provide an absolute amount by which he prefers a certain logo, but he can more easily indicate which of two logos he prefers.

Similarly, once a response to a comparison is received, the respondent may be asked to compare similar things until his response changes. In one embodiment, one feature of an object to compare may be gradually altered until the respondent changes his response. For example, the respondent may indicate that he prefers a first logo to a second logo. Then, the font size of the first logo is increased until the respondent indicates that he prefers the second logo.

Dynamic survey questions may employ principles of genetic algorithms, as well as other known techniques for adjusting parameters to improve an output. Genetic algorithms are described in "Genetic Programming II", by John R. Koza, published by The MIT Press, 1994.

It may be desirable to register the response time for each respondent question received, and use that response time as part of the data summarized for the client. For example, in indicating which of two logos is preferred, the client may desire to know whether respondents answered quickly or slowly. Short response times would tend to indicate the comparison was very easy and thus the chosen logo was clearly preferred, while long response times would tend to indicate the comparison was difficult and thus the chosen logo was marginally preferred.

Figure 20:
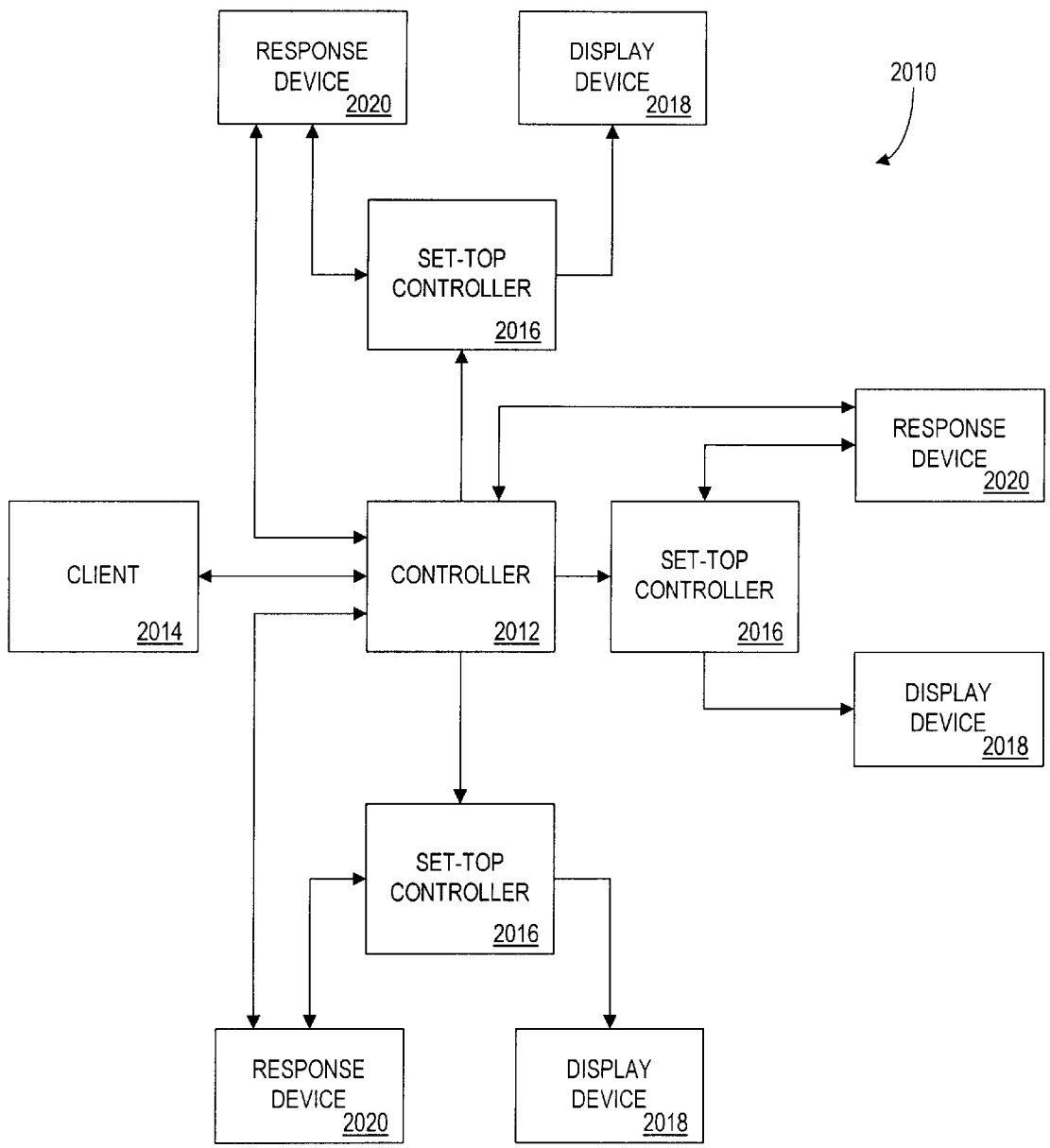
FIG. 20 is a schematic illustration of another embodiment of an apparatus for conducting a survey.

Referring to FIG. 20, another embodiment of an apparatus 2010 for conducting a survey comprises a controller 2012 that is in communication with a client device 2014 and with set-top controllers 2016. Each of the controller 2012 and the client device 2014 are typically computers or other devices for communicating over a computer network such as the Internet. Each of the set-top controllers 2016 is in communication with a display device 2018, e.g., a television, and a response device 2020. The controller communicates with the set-top controller 2016 via a television transmission network such as a cable television transmission network. Each response device 2020 communicates with the controller 2012. Although three set-top controllers 2016 are shown in FIG. 20, any number of set-top controllers may be in communication with the controller 12.

The structure and operation of the controller 2012, the client 2014 and the set-top controllers 2016 are similar to the like components in FIGS. 1 and 2, described hereinbefore. In contrast, the response device 2020 of the apparatus 2010 of FIG. 2 directly communicates with the controller 2012. In one embodiment, the response device 2020 is a telephone. The customer maintains an open telephone line by which an interactive voice response unit (IVRU) is connected to the controller 2012 transmitting the questions. Thus, questions can be answered by activating the number buttons on a touch-tone telephone. The IVRU is directly connected to the transmission of the survey questions in real-time, i.e. the questions can be answered via telephone one-by-one as they are transmitted. Alternatively, the answers to the questions can be collected by the set-top controller 2016 and then transmitted in a batch via telephone connection.

In another embodiment, the response device 2020 may be a PDA. The PDA is connected to the Internet, which in turn is connected to the controller 2012. The respondent receives the messages and views them on the television screen. The respondent responds to the questions on the PDA, and the responses are transmitted via Internet back to the controller 2020. Again, this can be done in real-time or in a batch process.

The disclosed system is more beneficial to marketers and testers of products than the conventional systems because (i) it enables targeted administration of surveys to a virtually unlimited number of participants, (ii) it motivates participation by providing payments, and (iii) it assures the accuracy and trustworthiness of the collected responses.

Administering surveys over cable television is an effective way of testing products. Consumers viewing television commercials can respond to survey questions simultaneously, and the controller can receive an immediate response to the product advertised thereby increasing the value of the survey data. The ability of the system to certify responses further increases the value of the survey data.

Although the present invention has been described with respect to a preferred embodiment thereof, those skilled in the art will note that various substitutions may be made to those embodiments described herein without departing from the spirit and scope of the present invention. For example, some or all of the steps performed by the controller may be performed by a respondent device.

What is claimed is:

1. A method for administering a survey, the method comprising:

creating a respondent question based on at least one survey question;

selecting a respondent;

transmitting the respondent question to the respondent via a television transmission network;

receiving a response from the respondent, the response corresponding to the respondent question;

applying an inconsistency test to the response to generate an inconsistency test result; and generating a fraud signal based on the inconsistency test result.

2. The method of claim 1, further comprising:

receiving a first signal from the respondent based on desire of respondent to answer the at least one survey question.

3. The method of claim 2, further comprising:

transmitting a prompt via the television transmission network requesting participation in the survey.

4. The method of claim 2, further comprising:

transmitting a signal via the television transmission network providing a television channel for conducting a survey.

5. The method of claim 1, further comprising:

transmitting a plurality of surveys to the respondent via the television transmission network; and receiving a selection response from the respondent, the selection response corresponding to a survey the respondent selects.

6. The method of claim 5, in which receiving a selection response from the respondent comprises:

receiving a selection response according to a predetermined parameter of the survey.

7. The method of claim 6, in which the predetermined parameter is the number of survey questions in each survey.

8. The method of claim 6, in which the predetermined parameter is a payment value provided for participating in each survey.

9. The method of claim 1, further comprising:

transmitting an offer to respond to a survey via the television transmission network to the respondent; and receiving a first signal from the respondent based on desire of respondent to participate in the survey.

10. The method of claim 1, further comprising:

receiving a respondent criterion that a respondent must match to participate in the survey.

11. The method of claim 10, in which the respondent criterion includes a degree to which a respondent must match the respondent criterion.

12. The method of claim 10, in which selecting a respondent comprises:

receiving a respondent profile corresponding to a respondent; and selecting the respondent based on the respondent criterion and the respondent profile.

13. The method of claim 1, in which selecting a respondent comprises:

transmitting a set of qualification questions to the respondent via the television transmission network;

receiving a set of qualification responses from the respondent, each qualification response corresponding to a qualification question of the set of qualification questions;

applying a qualification test to the set of qualification responses to generate a qualification test result; and selecting the respondent based on the qualification test result.

14. The method of claim 13, further comprising:

storing the qualification test result.

15. The method of claim 1, in which selecting a respondent comprises:

selecting a set of tentative respondents;

transmitting a set of qualification questions to each tentative respondent;

receiving a set of qualification responses from each tentative respondent, each qualification response corresponding to a qualification question of the set of qualification questions;

applying a qualification test to the set of qualification responses to generate a qualification test result for each tentative respondent; and selecting a set of respondents based on the qualification test result of each tentative respondent.

16. The method of claim 1, further comprising:

determining a rating of the respondent based on the fraud signal.

17. The method of claim 16, further comprising:

storing the rating of the respondent.

18. The method of claim 16, in which selecting a respondent comprises:

selecting the respondent based on the rating of the respondent.

19. The method of claim 1, in which transmitting the respondent question to the respondent comprises:

transmitting a plurality of respondent questions;

and in which the receiving a response from the respondent comprises:

receiving a response from the respondent after transmission of a corresponding respondent question and before transmission of a next respondent question.

20. The method of claim 19, in which applying an inconsistency test comprises:

applying an inconsistency test to selected responses of the plurality of responses after receiving a response and before the transmission of a next respondent question.

21. The method of claim 1, in which receiving a response from the respondent comprises:

receiving a plurality of responses from the respondent after transmission of a predetermined number of respondent questions.

22. The method of claim 21, in which applying an inconsistency test comprises:

applying an inconsistency test to selected responses of the plurality of responses after receiving a predetermined number of respondent responses.

23. The method of claim 1, in which creating a respondent question comprises:

creating a first question based on the survey question; and creating a second question based on the survey question;

and in which transmitting comprises:
   transmitting the first question and the second question to the respondent;
and in which receiving a response comprises:
   receiving a first response and a second response from the respondent, the first response corresponding to the first question and the second response corresponding to the second question.

24. The method of claim 23, in which applying an inconsistency check comprises:
   determining whether the first response matches the second response.

25. The method of claim 24, in which generating a fraud signal comprises:
   generating a fraud signal if the first response does not match the second response.

26. The method of claim 23, in which the second question has an answer sequence that is different from an answer sequence of the first question.

27. The method of claim 23, in which creating a second question comprises:
   creating a second question based on the survey question, the second question having an answer sequence different from the answer sequence of the first question.

28. The method of claim 1, further comprising:
   registering a start time at which the respondent question is transmitted; and
   registering a stop time at which the response is received.

29. The method of claim 28, in which applying an inconsistency test comprises:
   calculating a response time based on the start time and the stop time.

30. The method of claim 29, in which generating a fraud signal comprises:
   generating a fraud signal if the response time is less than a predetermined threshold.

31. The method of claim 28, further comprising:
   registering a start time for each of a plurality of respondent questions; and
   registering a stop time for each of a plurality of responses, each response corresponding to a question having a measured start time.

32. The method of claim 31, in which applying an inconsistency test comprises:
   calculating a plurality of response times, each response time based on a start time and a corresponding stop time;
and in which generating a fraud signal comprises:
   generating a fraud signal if at least a predetermined percentage of the plurality of response times are greater than a predetermined threshold.

33. The method of claim 31, in which applying an inconsistency test comprises:
   calculating a plurality of response times, each response time based on a start time and a corresponding stop time; and
   calculating a deviation of the plurality of response times;
and in which the step of generating a fraud signal comprises:
   generating a fraud signal if the deviation is less than a predetermined threshold.

34. The method of claim 1, in which applying an inconsistency test to the set of responses comprises:
   ascertaining whether the response defines a predetermined pattern.

35. The method of claim 1, in which generating a fraud signal comprises:
   generating a fraud signal if the response defines a predetermined pattern.

36. The method of claim 1, further comprising:
storing the response.

37. The method of claim 1, further comprising:
providing a payment amount to the respondent.

38. The method of claim 37, further comprising:
   setting the payment amount based on at least one of a budget amount, a deadline, a desired confidence level, the set of responses, the number of respondent questions, a time of response, a rating of the respondent and a respondent profile.

39. The method of claim 37, further comprising:
   setting the payment amount based on a randomly-generated bonus.

40. The method of claim 37, further comprising:
   setting the payment amount based on a mode of displaying the survey on the television transmission network.

41. The method of claim 40, further comprising:
   setting a reduced payment for responding to the at least one survey question while the television transmission network is in a picture in picture mode.

42. The method of claim 40, further comprising:
   setting a non-reduced payment for responding to the at least one survey question while the television transmission network is in a full screen mode.

43. The method of claim 37, further comprising:
crediting payment to a cable bill of the respondent.

44. The method of claim 37, further comprising:
displaying the payment amount.

45. The method of claim 1, further comprising:
   transmitting results of the survey to a client requesting the survey.

46. The method of claim 1, in which the television transmission network comprises at least one of a coaxial cable, a wireless system, a twisted wire pair cable and a fiber optic cable.

47. The method of claim 1, in which receiving the respondent response comprises:
   receiving the respondent response via the television transmission network.

48. The method of claim 1, in which receiving the respondent response comprises receiving the responses via a communication network comprising at least one of a twisted wire pair cable, a coaxial cable, a wireless network, a fiber optic cable, a telephone line and a PDA.

49. The method of claim 1, in which the survey question comprises at least one of text, a graphical image, and audio signals.

50. The method of claim 1, in which the survey further includes a deadline.

51. The method of claim 1, in which the survey further includes a confidence level.

52. The method of claim 1, in which the survey further includes a minimum number of respondents.

53. The method of claim 1, further comprising:
   creating an adjusted question based on the response and the survey question.

54. The method of claim 1, in which receiving a response comprises:
   receiving responses from a plurality of respondents;
   and further comprising:

creating an adjusted question based on the responses and the survey question.

55. The method of claim 1, further comprising:
receiving responses from a plurality of respondents;
counting the responses;
selecting an additional respondent if there are less than a predetermined number of responses; and
transmitting the respondent question to the additional respondent via the television transmission network.

56. The method of claim 1, further comprising:
receiving responses from a plurality of respondents;
calculating a confidence level based on the responses;
selecting an additional respondent if the confidence level is less than a predefined confidence level; and
transmitting the respondent question to the additional respondent via the television transmission network.

57. The method of claim 1, further comprising:
receiving a first survey, the first survey including a first survey question; and
receiving a second survey, the second survey including a second survey question;
and in which creating a respondent question comprises:
creating a first respondent question based on the first survey question; and
creating a second respondent question based on the second survey question.

58. The method of claim 57, in which transmitting the respondent question to the respondent comprises:
transmitting the first respondent question and the second respondent question to the respondent via the television transmission network.

59. The method of claim 57, further comprising:
transmitting the first response to a first client via the television transmission network; and
transmitting the second response to a second client via the television transmission network.

60. The method of claim 1, in which the controller is a computer operated by an Internet Service Provider.

61. The method of claim 1, in which the controller is a computer operated by a cable television provider.

62. The method of claim 1, in which the survey question defines a comparison to be made.

63. A method for administering a survey, the method comprising:
creating a first respondent question based on at least one survey question;
selecting a respondent;
transmitting the first respondent question to the respondent via a television transmission network;
receiving a first response from the respondent, the first response corresponding to the first respondent question;
applying a first inconsistency test to the first response to generate a first inconsistency test result;
creating a second respondent question if the first inconsistency test result is greater than a first predetermined threshold;
transmitting the second respondent question to the respondent via a television transmission network;
receiving a second response from the respondent, the second response corresponding to the second respondent question;
applying a second inconsistency test to the second response to generate a second inconsistency test result; and
generating a fraud signal based on at least one of the first inconsistency test result and the second inconsistency test result.

64. The method of claim 63, in which the second respondent question is selected from a predetermined set of questions.

65. The method of claim 63, in which the second respondent question is based on a certification question.

66. A method for administering a survey, the method comprising:
creating a first respondent question based on at least one survey question;
selecting a respondent;
transmitting the first respondent question to the respondent via the television transmission network;
receiving a first response from the respondent, the first response corresponding to the first respondent question;
applying a first inconsistency test to the first response to generate a first inconsistency rating;
creating a second respondent question if the first inconsistency test result is greater than a first predetermined threshold, the second respondent question being based on one of a set of predetermined questions;
transmitting the second respondent question to the respondent via the television transmission network;
receiving a second response from the respondent, the second response corresponding to the second respondent question;
applying a second inconsistency test to the second response to generate a second inconsistency test result; and
generating a fraud signal based on the second inconsistency test result.

67. The method of claim 66, in which the second respondent question is based on a certification question.

68. An apparatus for administering a survey; the apparatus comprising:
at least one respondent device;
a first storage device; and
a first processor connected to the first storage device and respondent device;
the first storage device storing a first program for controlling the first processor; and
the first processor operative with the first program to:
create a respondent question based on at least one survey question;
select a respondent;
transmit the respondent question to the respondent device via a television transmission network;
receive a response from the respondent device, the response corresponding to the respondent question;
apply an inconsistency test to the response to generate an inconsistency test result; and
generate a fraud signal based on the inconsistency test result.

69. The apparatus of claim 68, in which the respondent device comprises:
a television device;
a second storage device; and
a second processor connected to the second storage device and the television device;
the second storage device storing a second program for controlling the second processor;

and the second processor operative with the second program to:
receive the respondent question;
transmit the respondent question to the television device;
receive the response from the respondent; and
transmit the response to the first processor.

70. The apparatus of claim 69, further comprising an input device to receive a response from the respondent and to provide the response to the second processor.

71. The apparatus of claim 70, in which the input device transmits the response of the respondent to the television device.

72. The apparatus of claim 69, further comprises a decoder device connected to the first processor to decode television signals representative of the respondent question transmitted via the television transmission network.

73. The apparatus of claim 69, in which the television device displays the respondent question to the respondent.

74. The apparatus of claim 68, in which the television transmission network comprises at least one of a coaxial cable, a wireless system, a twisted pair cable and a fiber optic cable.

75. The apparatus of claim 68, further comprising:
a client device connected to the first processor, and in which the first program further comprises:
receiving a survey question from the client device.

76. The apparatus of claim 68, in which the respondent device comprises:
a television device;
a second storage device; and
a second processor connected to the second storage device and the television device;
the second storage device storing a second program for controlling the second processor; and the second processor operative with the program to:
receive the respondent question; and
transmit the respondent question to the television device.

77. The apparatus of claim 76, further comprising an input device to receive the response of the respondent and to transmit the response to the first processor via a communication network.

78. The apparatus of claim 76, in which the communication network comprises at least one of a twisted wire pair cable, a coaxial cable, a wireless network, a fiber optic cable, a telephone line and a PDA.

* * * * *